United States Patent
Yuan et al.

(10) Patent No.: US 12,316,419 B2
(45) Date of Patent: May 27, 2025

(54) INFORMATION TRANSMISSION METHOD AND APPARATUS

(71) Applicant: Huawei Technologies Co., Ltd., Shenzhen (CN)

(72) Inventors: Yiling Yuan, Shanghai (CN); Shibin Ge, Shanghai (CN); Li Fan, Shanghai (CN); Junhui Gao, Shenzhen (CN); Huangping Jin, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/478,412

(22) Filed: Sep. 29, 2023

(65) Prior Publication Data

US 2024/0022307 A1    Jan. 18, 2024

Related U.S. Application Data

(63) Continuation of application No. PCT/CN2022/081019, filed on Mar. 15, 2022.

(30) Foreign Application Priority Data

Apr. 6, 2021 (CN) .......................... 202110368766.5

(51) Int. Cl.
 *H04B 7/06* (2006.01)
 *H04L 27/26* (2006.01)
(52) U.S. Cl.
 CPC ......... *H04B 7/0634* (2013.01); *H04B 7/0626* (2013.01); *H04L 27/265* (2013.01)
(58) Field of Classification Search
 CPC ... H04J 11/00; H04B 7/00; H04B 7/06; H04B 7/10; H04B 7/048; H04B 7/0417;

(Continued)

(56) References Cited

U.S. PATENT DOCUMENTS

| | | | | |
|---|---|---|---|---|
| 2022/0182120 A1* | 6/2022 | Sergeev | ............... | H04B 7/0639 |
| 2023/0131045 A1* | 4/2023 | Huang | .................. | H04L 5/0023 375/267 |
| 2024/0007164 A1* | 1/2024 | Zhang | .................. | H04B 7/0478 |

OTHER PUBLICATIONS

3rd Generation Partnership Project; Technical Specification Group Radio Access Network; NR; Physical layer procedures for data (Release 15), 3GPP TS 38.214 V15.12.0 (Mar. 2021), total: 106 pages.

(Continued)

*Primary Examiner* — Shawkat M Ali
(74) *Attorney, Agent, or Firm* — Slater Matsil, LLP

(57) ABSTRACT

This application relates to the field of communication technologies, and provides an information transmission method and an apparatus. In this method, a radio access network device sends, to a terminal device, first indication information indicating first information and second information and second indication information indicating a first quantity of DFT vectors, the first information indicates a first quantity of to-be-selected ports, and the second information indicates a first compression factor. The radio access network device further sends a reference signal to the terminal device. The terminal device sends downlink channel state information to the radio access network device based on the first indication information, the second indication information, and the reference signal. The compression factor is a compression factor of a complex coefficient matrix. There is a correspondence between the compression factor and a quantity of transport layers.

16 Claims, 7 Drawing Sheets

(58) Field of Classification Search
CPC .. H04B 7/0452; H04B 7/0456; H04B 7/0626;
H04B 7/0634; H04B 17/318; H04L 1/06;
H04L 5/00; H04L 5/0094; H04L 27/26;
H04W 24/08; H04W 24/10; H04W 28/08;
H04W 72/00; H04W 724/12; H04W
724/20; H04W 72/23; H04W 76/27
USPC ............... 375/219, 260, 262, 267, 295, 316
See application file for complete search history.

(56) References Cited

OTHER PUBLICATIONS

LG Electronics: "Discussion on overhead reduction for Type II codebook", 3GPP TSG RAN WG1 #96bis, R1-1904207_CSI_V2, 3rd Generation Partnership Project (3GPP), Mobile Competence Centre; 650, Route Des Lucioles; F-06921 Sophia-Antipolis Cedex; France, vol. RAN WG1, No. Xi'an, China; Apr. 8, 2019-Apr. 12, 2019 Apr. 8-12, 2019 (Apr. 8, 2019), XP051699536, total 14 pages.
Samsung: "CSI enhancement for MU-MIMO", 3GPP TSG RAN WG1 meeting #98; R1-1909536 MU CSI Update. 3rd Generation Partnership Project (3GPP), Mobile Competence Centre; 650, Route Des Lucioles; F-06921 Sophia-Antipolis Cedex; France, vol. RAN WG1, No. Prague, CZ; Aug. 26, 2019-Aug. 30, 2019 Aug. 26-30, 2019 (Aug. 26, 2019), XP051759817, total 19 pages.

* cited by examiner

INFORMATION TRANSMISSION METHOD AND APPARATUS

CROSS-REFERENCE TO RELATED APPLICATIONS

This application is a continuation of International Application No. PCT/CN2022/081019, filed on Mar. 15, 2022, which claims priority to Chinese Patent Application No. 202110368766.5, filed on Apr. 6, 2021. The disclosures of the aforementioned applications are hereby incorporated by reference in their entireties.

TECHNICAL FIELD

This application relates to the field of communication technologies, and in particular, to an information transmission method and an apparatus.

BACKGROUND

To improve spectral efficiency of a system, a massive multiple-input multiple-output (MIMO) technology is widely used. When the massive MIMO technology is used, a radio access network device needs to precode data before sending the data to a terminal device. Before precoding the data, the radio access network device needs to determine, based on channel state information (CSI) that is of a downlink channel and that is fed back by the terminal device to the radio access network device, a precoding matrix for precoding.

For a time division multiplexing (TDD) system, because an uplink channel and a downlink channel use a same frequency band, CSI of the downlink channel may be obtained through the uplink channel by using reciprocity of the channels, and a precoding matrix is determined. For a frequency division multiplexing (FDD) system, because a spacing between uplink and downlink frequency bands is greater than uplink bandwidth or downlink bandwidth, there is no complete reciprocity between uplink and downlink channels, but there is partial reciprocity between the uplink and downlink channels. Currently, partial reciprocity of FDD is not considered in parameter configuration of a codebook structure for precoding, and therefore the parameter configuration is not flexible.

SUMMARY

This application provides an information transmission method and an apparatus, to resolve a problem that parameter configuration of a codebook structure is not flexible in an FDD system.

To achieve the foregoing objective, the following technical solutions are provided in embodiments of this application.

According to a first aspect, an information transmission method is provided. The method includes: A terminal device receives first indication information and second indication information from a radio access network device, further receives a reference signal from the radio access network device, and sends downlink channel state information to the radio access network device based on the first indication information, the second indication information, and the reference signal. The first indication information indicates first information and second information. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The first information indicates a first quantity of to-be-selected ports. The first quantity of to-be-selected ports is one of at least one quantity of to-be-selected ports. The quantity of to-be-selected ports is a possible quantity of ports used by the terminal device to perform port selection. The second information indicates a first compression factor. The first compression factor is one of at least one compression factor. The compression factor is a possible compression factor of a complex coefficient matrix. The complex coefficient matrix is determined based on a port selected by the terminal device and the frequency domain basis matrix. There is a correspondence between the compression factor and a quantity of transport layers. The quantity of transport layers is a possible quantity of transport layers that corresponds to downlink channel state information reported by the terminal device to the radio access network device. In the method provided in the first aspect, the quantity of transport layers is no longer bound to the quantity of DFT vectors, but is bound to the compression factor. Because the compression factor has a large quantity of values, a problem that a quantity of non-zero elements in the complex coefficient matrix cannot be flexibly adjusted based on configuration of a related parameter of an existing codebook structure when the quantity of DFT vectors has a small quantity of values can be resolved.

In a possible implementation, the quantity of to-be-selected ports is a quantity of ports used by the terminal device to perform port selection in each polarization direction. In this possible implementation, the terminal device may determine a quantity of ports that need to be selected in each polarization direction.

In a possible implementation, the first indication information is implemented by using a first index in a first table, the first table includes a correspondence between the at least one quantity of to-be-selected ports and the at least one compression factor, and the first index indicates the first quantity of to-be-selected ports and the first compression factor. Different quantities of transport layers correspond to a same compression factor, or at least two of the different quantities of transport layers correspond to different compression factors. In this possible implementation, the radio access network device indicates the first quantity of to-be-selected ports and the first compression factor by using the first index. Compared with directly indicating the first quantity of to-be-selected ports and the first compression factor, signaling overheads can be reduced.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal. In this possible implementation, the first quantity of transmit ports and the first quantity of DFT vectors may be indicated to the terminal device at the same time, so that signaling overheads can be reduced.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors. In this possible implementation, the radio access network device indicates the first quantity of transmit ports and the first quantity of DFT vectors by using the second index. Compared with directly indicating the first quantity of transmit ports and the first quantity of DFT vectors, signaling overheads can be reduced.

In a possible implementation, the method further includes: The terminal device receives second configuration information from the radio access network device. The second configuration information is used to configure the second table. In this possible implementation, the terminal device may be enabled to determine the second table, so that when the radio access network device indicates the index in the second table, the terminal device may determine the quantity of transmit ports and the quantity of DFT vectors based on the index.

In a possible implementation, the first indication information and the second indication information are implemented by using a first index in a first table, the first table includes a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor. Different quantities of transport layers correspond to a same compression factor, or at least two of the different quantities of transport layers correspond to different compression factors. In this possible implementation, the radio access network device indicates the first quantity of to-be-selected ports, the first compression factor, and the first quantity of DFT vectors by using the first index. Compared with directly indicating the first quantity of to-be-selected ports, the first compression factor, and the first quantity of DFT vectors, signaling overheads can be reduced.

In a possible implementation, the method further includes: The terminal device receives first configuration information from the radio access network device. The first configuration information is used to configure the first table. In this possible implementation, the terminal device may be enabled to determine the first table, so that when the radio access network device indicates the index in the first table, the terminal device may determine one or more of the quantity of to-be-selected ports, the compression factor, or the quantity of DFT vectors based on the index.

In a possible implementation, the quantity of DFT vectors is 1 or 2.

According to a second aspect, an information transmission method is provided. The method includes: A radio access network device sends, to a terminal device, first indication information indicating first information and second information and second indication information indicating a first quantity of DFT vectors, and sends a reference signal to the terminal device. The first indication information, the second indication information, and the reference signal are used by the terminal device to determine downlink channel state information. The first quantity of DFT vectors is one of at least one quantity of DFT vectors. The quantity of DFT vectors is a possible quantity of DFT vectors included in a frequency domain basis matrix. The first information indicates a first quantity of to-be-selected ports. The first quantity of to-be-selected ports is one of at least one quantity of to-be-selected ports. The quantity of to-be-selected ports is a possible quantity of ports used by the terminal device to perform port selection. The second information indicates a first compression factor. The first compression factor is one of at least one compression factor. The compression factor is a possible compression factor of a complex coefficient matrix. The complex coefficient matrix is determined based on a port selected by the terminal device and the frequency domain basis matrix. There is a correspondence between the compression factor and a quantity of transport layers. The quantity of transport layers is a possible quantity of transport layers that corresponds to the downlink channel state information reported by the terminal device to the radio access network device. In the method provided in the second aspect, the quantity of transport layers is no longer bound to the quantity of DFT vectors, but is bound to the compression factor. Because the compression factor has a large quantity of values, a problem that a quantity of non-zero elements in the complex coefficient matrix cannot be flexibly adjusted based on configuration of a related parameter of an existing codebook structure when the quantity of DFT vectors has a small quantity of values can be resolved.

In a possible implementation, the method further includes: The radio access network device receives the downlink channel state information from the terminal device. The radio access network device determines a precoding matrix based on the downlink channel state information. The radio access network device precodes data based on the precoding matrix.

In a possible implementation, the quantity of to-be-selected ports is a quantity of ports used by the terminal device to perform port selection in each polarization direction. In this possible implementation, the terminal device may determine a quantity of ports that need to be selected in each polarization direction.

In a possible implementation, the first indication information is implemented by using a first index in a first table, the first table includes a correspondence between the at least one quantity of to-be-selected ports and the at least one compression factor, and the first index indicates the first quantity of to-be-selected ports and the first compression factor. Different quantities of transport layers correspond to a same compression factor, or at least two of the different quantities of transport layers correspond to different compression factors. In this possible implementation, the radio access network device indicates the first quantity of to-be-selected ports and the first compression factor by using the first index. Compared with directly indicating the first quantity of to-be-selected ports and the first compression factor, signaling overheads can be reduced.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal. In this possible implementation, the first quantity of transmit ports and the first quantity of DFT vectors may be indicated to the terminal device at the same time, so that signaling overheads can be reduced.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors. In this possible implementation, the radio access network device indicates the first quantity of transmit ports and the first quantity of DFT vectors by using the second index. Compared with directly indicating the first quantity of transmit ports and the first quantity of DFT vectors, signaling overheads can be reduced.

In a possible implementation, the method further includes: The radio access network device sends second configuration information to the terminal device. The second configuration information is used to configure the second table. In this possible implementation, the terminal device may be enabled to determine the second table, so that when the radio access network device indicates the index in the second table, the terminal device may determine the quantity of transmit ports and the quantity of DFT vectors based on the index.

In a possible implementation, the first indication information and the second indication information are implemented by using a first index in a first table, the first table includes a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor. Different quantities of transport layers correspond to a same compression factor, or at least two of the different quantities of transport layers correspond to different compression factors. In this possible implementation, the radio access network device indicates the first quantity of to-be-selected ports, the first compression factor, and the first quantity of DFT vectors by using the first index. Compared with directly indicating the first quantity of to-be-selected ports, the first compression factor, and the first quantity of DFT vectors, signaling overheads can be reduced.

In a possible implementation, the method further includes: The radio access network device sends first configuration information to the terminal device. The first configuration information is used to configure the first table. In this possible implementation, the terminal device may be enabled to determine the first table, so that when the radio access network device indicates the index in the first table, the terminal device may determine one or more of the quantity of to-be-selected ports, the compression factor, or the quantity of DFT vectors based on the index.

In a possible implementation, the quantity of DFT vectors is 1 or 2.

According to a third aspect, an information transmission method is provided. The method includes: A terminal device receives second indication information and third indication information from a radio access network device. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The third indication information indicates a first compression factor. The first compression factor is one of at least one compression factor. The compression factor is a possible compression factor of a complex coefficient matrix. The complex coefficient matrix is determined based on a port selected by the terminal device and the frequency domain basis matrix. There is a correspondence between the compression factor and a quantity of transport layers. The quantity of transport layers is a possible quantity of transport layers that corresponds to downlink channel state information reported by the terminal device to the radio access network device. The terminal device receives a reference signal from the radio access network device. The terminal device sends the downlink channel state information to the radio access network device based on the second indication information, the third indication information, and the reference signal. In the method provided in the third aspect, the quantity of transport layers is no longer bound to the quantity of DFT vectors, but is bound to the compression factor. Because the compression factor has a large quantity of values, a problem that a quantity of non-zero elements in the complex coefficient matrix cannot be flexibly adjusted based on configuration of a related parameter of an existing codebook structure when the quantity of DFT vectors has a small quantity of values can be resolved.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal. In this possible implementation, the first quantity of transmit ports and the first quantity of DFT vectors may be indicated to the terminal device at the same time, so that signaling overheads can be reduced.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors. In this possible implementation, the radio access network device indicates the first quantity of transmit ports and the first quantity of DFT vectors by using the second index. Compared with directly indicating the first quantity of transmit ports and the first quantity of DFT vectors, signaling overheads can be reduced.

In a possible implementation, the method further includes: The terminal device receives second configuration information from the radio access network device. The second configuration information is used to configure the second table. In this possible implementation, the terminal device may be enabled to determine the second table, so that when the radio access network device indicates the index in the second table, the terminal device may determine the quantity of transmit ports and the quantity of DFT vectors based on the index.

In a possible implementation, a quantity of to-be-selected ports is a preset value, and the quantity of to-be-selected ports is a quantity of ports used for port selection when the terminal device sends the downlink channel state information to the radio access network device.

In a possible implementation, the quantity of DFT vectors is 1.

According to a fourth aspect, an information transmission method is provided. The method includes: A radio access network device sends second indication information and third indication information to a terminal device. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The third indication information indicates a first compression factor. The first compression factor is one of at least one compression factor. The compression factor is a possible compression factor of a complex coefficient matrix. The complex coefficient matrix is determined based on a port selected by the terminal device and the frequency domain basis matrix. There is a correspondence between the compression factor and a quantity of transport layers. The quantity of transport layers is a possible quantity of transport layers that corresponds to downlink channel state information reported by the terminal device to the radio access network device. The radio access network device sends a reference signal to the terminal device. The second indication information, the third indication information, and the reference signal are used to determine the downlink channel state information. In the method provided in the fourth aspect, the quantity of transport layers is no longer bound to the quantity of DFT vectors, but is bound to the compression factor. Because the compression factor has a large quantity of values, a problem that a quantity of non-zero elements in the complex coefficient matrix cannot be flexibly adjusted based on configuration of a related parameter of an existing codebook structure when the quantity of DFT vectors has a small quantity of values can be resolved.

In a possible implementation, the method further includes: The radio access network device receives the downlink channel state information from the terminal device. The radio access network device determines a precoding matrix based on the downlink channel state information. The radio access network device precodes data based on the precoding matrix.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal. In this possible implementation, the first quantity of transmit ports and the first quantity of DFT vectors may be indicated to the terminal device at the same time, so that signaling overheads can be reduced.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors. In this possible implementation, the radio access network device indicates the first quantity of transmit ports and the first quantity of DFT vectors by using the second index. Compared with directly indicating the first quantity of transmit ports and the first quantity of DFT vectors, signaling overheads can be reduced.

In a possible implementation, the method further includes: The radio access network device sends second configuration information to the terminal device. The second configuration information is used to configure the second table. In this possible implementation, the terminal device may be enabled to determine the second table, so that when the radio access network device indicates the index in the second table, the terminal device may determine the quantity of transmit ports and the quantity of DFT vectors based on the index.

In a possible implementation, a quantity of to-be-selected ports is a preset value, and the quantity of to-be-selected ports is a quantity of ports used for port selection when the terminal device sends the downlink channel state information to the radio access network device.

In a possible implementation, the quantity of DFT vectors is 1.

According to a fifth aspect, a communication apparatus is provided. The communication apparatus includes a communication unit and a processing unit. The processing unit is configured to receive first indication information and second indication information from a radio access network device by using the communication unit. The first indication information indicates first information and second information. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The first information indicates a first quantity of to-be-selected ports. The first quantity of to-be-selected ports is one of at least one quantity of to-be-selected ports. The quantity of to-be-selected ports is a possible quantity of ports used by the communication apparatus to perform port selection. The second information indicates a first compression factor. The first compression factor is one of at least one compression factor. The compression factor is a possible compression factor of a complex coefficient matrix. The complex coefficient matrix is determined based on a port selected by the communication apparatus and the frequency domain basis matrix. There is a correspondence between the compression factor and a quantity of transport layers. The quantity of transport layers is a possible quantity of transport layers that corresponds to downlink channel state information reported by the communication apparatus to the radio access network device. The processing unit is further configured to receive a reference signal from the radio access network device by using the communication unit. The processing unit is further configured to send the downlink channel state information to the radio access network device based on the first indication information, the second indication information, and the reference signal by using the communication unit. For example, the communication apparatus is a terminal device.

In a possible implementation, the quantity of to-be-selected ports is a quantity of ports used by the communication apparatus to perform port selection in each polarization direction.

In a possible implementation, the first indication information is implemented by using a first index in a first table, the first table includes a correspondence between the at least one quantity of to-be-selected ports and the at least one compression factor, and the first index indicates the first quantity of to-be-selected ports and the first compression factor. Different quantities of transport layers correspond to a same compression factor, or at least two of the different quantities of transport layers correspond to different compression factors.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors.

In a possible implementation, the processing unit is further configured to receive second configuration information from the radio access network device by using the communication unit. The second configuration information is used to configure the second table.

In a possible implementation, the first indication information and the second indication information are implemented by using a first index in a first table, the first table includes a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor. Different quantities of transport layers correspond to a same compression factor, or at least two of the different quantities of transport layers correspond to different compression factors.

In a possible implementation, the processing unit is further configured to receive first configuration information from the radio access network device by using the communication unit. The first configuration information is used to configure the first table.

In a possible implementation, the quantity of DFT vectors is 1 or 2.

According to a sixth aspect, a communication apparatus is provided. The communication apparatus includes a communication unit and a processing unit. The processing unit is configured to send first indication information and second indication information to a terminal device by using the communication unit. The first indication information indicates first information and second information. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The first information indicates a first quantity of to-be-selected ports. The first quantity of to-be-selected ports is one of at least one quantity of to-be-selected ports. The quantity of to-be-selected ports is a possible quantity of ports used by the terminal device to perform port selection. The second information indicates a first compression factor. The first compression factor is one of at least one compression factor. The compression factor is a possible compression factor of a complex coefficient matrix. The complex coefficient matrix is determined based on a port selected by the terminal device and the frequency domain basis matrix. There is a correspondence between the compression factor and a quantity of transport layers. The quantity of transport layers is a possible quantity of transport layers that corresponds to downlink channel state information reported by the terminal device to the communication apparatus. The processing unit is further configured to send a reference signal to the terminal device by using the communication unit. The first indication information, the second indication information, and the reference signal are used by the terminal device to determine the downlink channel state information. For example, the communication apparatus is a radio access network device.

In a possible implementation, the processing unit is further configured to: receive the downlink channel state information from the terminal device by using the communication unit; determine a precoding matrix based on the downlink channel state information; and precode data based on the precoding matrix.

In a possible implementation, the quantity of to-be-selected ports is a quantity of ports used by the terminal device to perform port selection in each polarization direction.

In a possible implementation, the first indication information is implemented by using a first index in a first table, the first table includes a correspondence between the at least one quantity of to-be-selected ports and the at least one compression factor, and the first index indicates the first quantity of to-be-selected ports and the first compression factor. Different quantities of transport layers correspond to a same compression factor, or at least two of the different quantities of transport layers correspond to different compression factors.

In a possible implementation, the second indication information further indicates a first quantity of transmit ports, the first quantity of transmit ports is one of at least one quantity of transmit ports, and the quantity of transmit ports is a possible quantity of ports used by the communication apparatus to send the reference signal.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors.

In a possible implementation, the processing unit is further configured to send second configuration information to the terminal device by using the communication unit. The second configuration information is used to configure the second table.

In a possible implementation, the first indication information and the second indication information are implemented by using a first index in a first table, the first table includes a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor. Different quantities of transport layers correspond to a same compression factor, or at least two of the different quantities of transport layers correspond to different compression factors.

In a possible implementation, the processing unit is further configured to send first configuration information to the terminal device by using the communication unit. The first configuration information is used to configure the first table.

In a possible implementation, the quantity of DFT vectors is 1 or 2.

According to a seventh aspect, a communication apparatus is provided. The communication apparatus includes a communication unit and a processing unit. The processing unit is configured to receive second indication information and third indication information from a radio access network device by using the communication unit. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The third indication information indicates a first compression factor. The first compression factor is one of at least one compression factor. The compression factor is a possible compression factor of a complex coefficient matrix. The complex coefficient matrix is determined based on a port selected by the communication apparatus and the frequency domain basis matrix. There is a correspondence between the compression factor and a quantity of transport layers. The quantity of transport layers is a possible quantity of transport layers that corresponds to downlink channel state information reported by the communication apparatus to the radio access network device. The processing unit is further configured to receive a reference signal from the radio access network device by using the communication unit. The processing unit is further configured to send the downlink channel state information to the radio access network device by using the communication unit based on the second indication information, the third indication information, and the reference signal. For example, the communication apparatus is a terminal device.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors.

In a possible implementation, the processing unit is further configured to receive second configuration information from the radio access network device by using the communication unit. The second configuration information is used to configure the second table.

In a possible implementation, a quantity of to-be-selected ports is a preset value, and the quantity of to-be-selected ports is a quantity of ports used for port selection when the communication apparatus sends the downlink channel state information to the radio access network device.

In a possible implementation, the quantity of DFT vectors is 1.

According to an eighth aspect, a communication apparatus is provided. The communication apparatus includes a communication unit and a processing unit. The processing unit is configured to send second indication information and third indication information to a terminal device by using the communication unit. The second indication information indicates a first quantity of DFT vectors. The first quantity of DFT vectors is one of at least one quantity of DFT vectors. The quantity of DFT vectors is a possible quantity of DFT vectors included in a frequency domain basis matrix. The third indication information indicates a first compression factor. The first compression factor is one of at least one compression factor. The compression factor is a possible compression factor of a complex coefficient matrix. The complex coefficient matrix is determined based on a port selected by the terminal device and the frequency domain basis matrix. There is a correspondence between the compression factor and a quantity of transport layers. The quantity of transport layers is a possible quantity of transport layers that corresponds to downlink channel state information reported by the terminal device to the communication apparatus. The processing unit is further configured to send a reference signal to the terminal device by using the communication unit. The second indication information, the third indication information, and the reference signal are used to determine the downlink channel state information. For example, the communication apparatus is a radio access network device.

In a possible implementation, the processing unit is further configured to: receive the downlink channel state information from the terminal device by using the communication unit; determine a precoding matrix based on the downlink channel state information; and precode data based on the precoding matrix.

In a possible implementation, the second indication information further indicates a first quantity of transmit ports, the first quantity of transmit ports is one of at least one quantity of transmit ports, and the quantity of transmit ports is a possible quantity of ports used by the radio access network device to send the reference signal.

In a possible implementation, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors.

In a possible implementation, the processing unit is further configured to send second configuration information to the terminal device by using the communication unit. The second configuration information is used to configure the second table.

In a possible implementation, a quantity of to-be-selected ports is a preset value, and the quantity of to-be-selected ports is a quantity of ports used for port selection when the terminal device sends the downlink channel state information to the communication apparatus.

In a possible implementation, the quantity of DFT vectors is 1.

According to a ninth aspect, a communication apparatus is provided. The communication apparatus includes a processor. The processor is connected to a memory. The memory is configured to store computer-executable instructions. The processor executes the computer-executable instructions stored in the memory, to implement the method according to any one of the first aspect to the fourth aspect. For example, the memory and the processor may be integrated, or may be independent components. If the memory and the processor are independent components, the memory may be located inside the communication apparatus, or may be located outside the communication apparatus.

In a possible implementation, the processor includes a logic circuit, and further includes an input interface and/or an output interface. For example, the output interface is configured to perform a sending action in a corresponding method, and the input interface is configured to perform a receiving action in the corresponding method.

In a possible implementation, the communication apparatus further includes a communication interface and a communication bus. The processor, the memory, and the communication interface are connected through the communication bus. The communication interface is configured to perform the sending/receiving action in the corresponding method. The communication interface may also be referred to as a transceiver. Optionally, the communication interface includes at least one of a transmitter or a receiver. In this case, the transmitter is configured to perform the sending action in the corresponding method, and the receiver is configured to perform the receiving action in the corresponding method.

In a possible implementation, the communication apparatus exists in a product form of a chip.

According to a tenth aspect, a chip is provided. The chip includes a processor and an interface. The processor is coupled to a memory through the interface. When the processor executes a computer program or computer-executable instructions in the memory, the method according to any one of the first aspect to the fourth aspect is performed.

According to an eleventh aspect, a communication system is provided. The communication system includes the foregoing radio access network device and/or the foregoing terminal device.

According to a twelfth aspect, a computer-readable storage medium is provided. The computer-readable storage medium includes computer-readable instructions. When the computer-readable instructions are run on a computer, the computer is enabled to perform the method according to any one of the first aspect to the fourth aspect.

According to a thirteenth aspect, a computer program product including computer-readable instructions is provided. When the computer-readable instructions are run on a computer, the computer is enabled to perform the method according to any one of the first aspect to the fourth aspect.

For technical effects brought by any implementation of the ninth aspect to the thirteenth aspect, refer to technical effects brought by the implementations of any one of the first aspect to the fourth aspect. Details are not described herein.

It should be noted that, on the premise that the solutions do not conflict, the solutions in the foregoing aspects may be combined.

DETAILED DESCRIPTION OF ILLUSTRATIVE EMBODIMENTS

Figure 1:
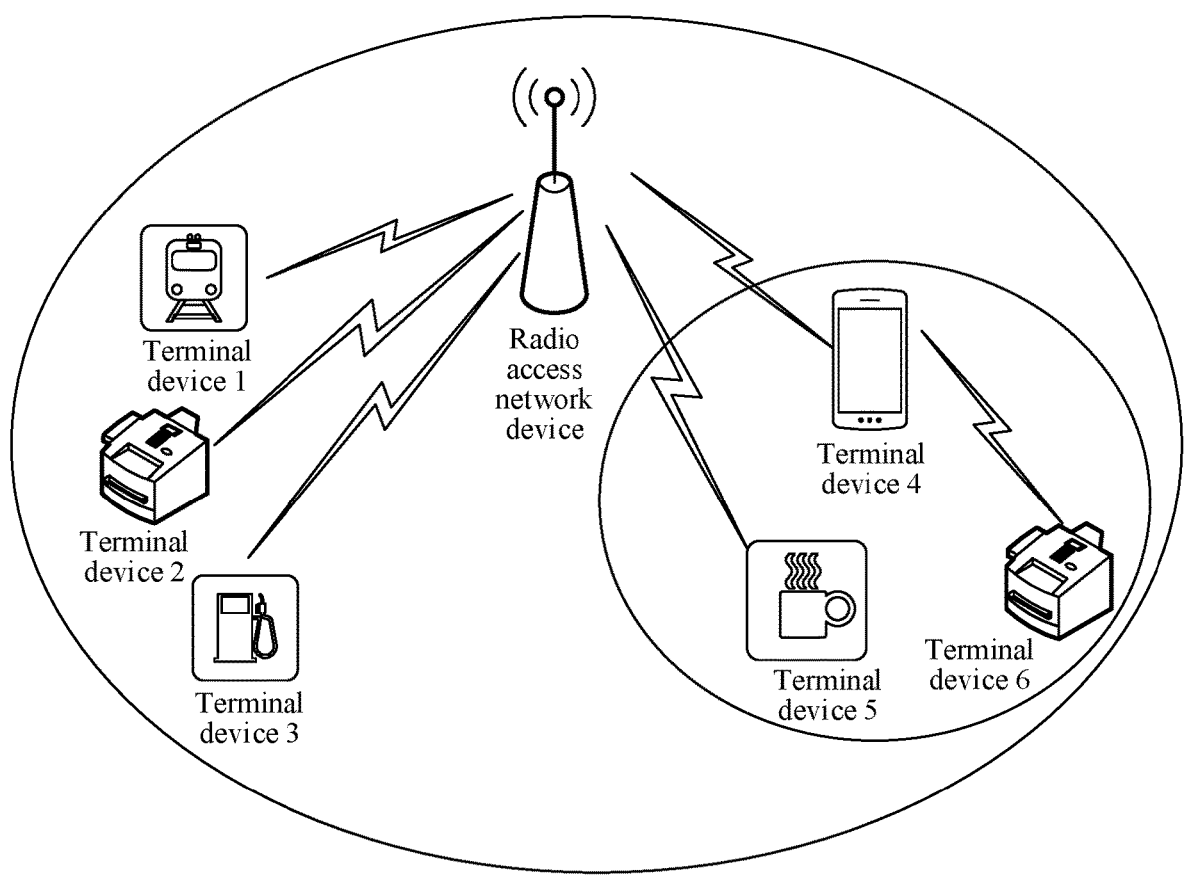
FIG. 1 is a schematic diagram of a network architecture.

To make embodiments of this application clearer, some concepts in this application are first briefly described.

1. Precoding Technology

When a channel status is known, a sending device (for example, a radio access network device) may process a to-be-sent signal by using a precoding matrix that matches the channel status, so that a precoded to-be-sent signal adapts to a channel, to reduce complexity of eliminating impact between channels by a receiving device (for example, a terminal device). Therefore, after the precoding processing is performed on the to-be-sent signal, received signal quality (for example, a signal to interference plus noise ratio (SINR)) is improved.

The precoding technology can implement transmission between the sending device and a plurality of receiving devices on a same time-frequency resource, that is, implement multi-user multiple-input multiple-output (MU-MIMO). It should be understood that descriptions related to the precoding technology in this specification are merely an example for ease of understanding, and are not intended to limit the protection scope of embodiments of this application. In a specific implementation process, the radio access network device mainly determines the precoding matrix based on CSI of a downlink channel, and precodes data. In addition, the radio access network device may alternatively precode the data in another manner. For example, when the CSI cannot be obtained, the precoding is performed by using a preset precoding matrix or in a weighted processing manner. For brevity, specific content thereof is not described herein again.

2. Channel State Information Report (CSI Report)

The CSI report may also be referred to as CSI for short. CSI is information that is reported by a receiving device (for example, a terminal device) to a sending device (for example, a radio access network device) in a wireless communication system and that is used to describe a channel attribute of a communication link. The CSI may include, for example, but is not limited to, a precoding matrix indicator (PMI), a rank indication (RI), a channel quality indicator (CQI), and a layer indicator (LI).

The PMI is mainly used in this application. It should be noted that, after the terminal device reports the PMI to the radio access network device, the radio access network device needs to determine a finally used precoding matrix based on the PMI and another factor.

3. PMI

The PMI indicates a precoding matrix. For example, the precoding matrix may be a precoding matrix determined by a terminal device based on a channel matrix of each frequency domain unit. The PMI may also be referred to as a codebook.

4. Transport Layer

The transport layer may also be referred to as a spatial layer. In MIMO, one spatial layer may be considered as one data stream that can be independently transmitted. To improve spectrum resource utilization and improve a data transmission capability of a communication system, a radio access network device may perform parallel data transmission for a terminal device by using a plurality of spatial layers. A quantity of transport layers is a rank of a channel matrix.

5. Delay Information, Angle Information, and Angle-Delay Information

When a radio signal is transmitted through a radio channel, the radio signal may reach a receive antenna through a plurality of paths (multipath for short). Each path in the multipath is corresponding to one piece of delay information and one piece of angle information.

The delay information is transmission time of the radio signal on different paths, is determined by a distance and a speed, and is irrelevant to a frequency domain of the radio signal. When the radio signal is transmitted on the different paths, different transmission delays exist due to different distances. Because physical locations of a radio access network device and a terminal device are fixed, multipath distribution of uplink and downlink channels is the same in terms of delay. Therefore, delay information of uplink and downlink channels in an FDD system may be considered to be the same, that is, reciprocal.

The angle information may be an angle of arrival (AOA) at which the radio signal arrives at the receive antenna through the radio channel, or may be an angle of departure (AOD) at which a signal is transmitted by using a transmit antenna. In embodiments of this application, the angle information may be an angle of arrival at which an uplink signal arrives at a radio access network device, or may be an angle of departure at which the radio access network device transmits a downlink signal. Due to reciprocity of transmission paths of the uplink and downlink channels at different frequencies, the angle of arrival of the uplink signal and the angle of departure of the downlink signal may be considered to be reciprocal.

The angle information may actually be an angle vector, and the delay information may actually be a delay vector. In this application, a pair of delay information and angle information is referred to as an angle-delay pair.

6. Frequency Domain Vector

The frequency domain vector may also be referred to as a frequency domain component vector, a frequency domain basis vector, or the like, and may be used to represent a change rule of a channel in frequency domain. When a radio signal is transmitted through a radio channel, the radio signal may reach a receive antenna through a plurality of paths. Frequency-selective fading caused by multipath delays is a change of a frequency-domain channel. Therefore, different frequency domain vectors may be used to represent the change rule that is of the channel in frequency domain and that is caused by delays on different transmission paths. One frequency domain vector is corresponding to one piece of delay information.

For example, the frequency domain vector may be a discrete Fourier transform (DFT) vector.

7. Spatial Domain Vector

The spatial domain vector may also be referred to as a spatial domain component vector, a beam vector, a spatial domain beam basis vector, a spatial domain basis vector, or the like. Each element in the spatial domain vector may represent a weight of each antenna port. Based on the weight of each antenna port that is represented by each element in the spatial domain vector, signals of the antenna ports are linearly superposed, to form an area with a strong signal in a direction in space. One spatial domain vector is corresponding to one piece of angle information.

For example, the spatial domain vector may be a DFT vector.

8. Reference Signal (RS)

The reference signal may also be referred to as a pilot signal, a reference sequence, or the like. In embodiments of this application, the reference signal may be a reference signal used for channel measurement. For example, the reference signal may be a CSI-RS used for downlink channel measurement, or may be a sounding reference signal (SRS) used for uplink channel measurement. It should be understood that the reference signals listed above are merely examples, and should not constitute any limitation on this application. This application does not exclude a possibility of defining another reference signal in a future protocol to implement a same or similar function. An RS used to obtain CSI of a downlink channel may also be referred to as a downlink reference signal or a CSI-RS.

A radio access network device may precode the reference signal, and send the reference signal to a terminal device. The precoding may include beamforming and phase rotation. For example, the beamforming may be implemented by precoding the reference signal based on one or more angle vectors, and the phase rotation may be implemented by precoding the reference signal based on one or more delay vectors.

9. Port

A port in this application refers to a port of a reference signal, and refers to an antenna port used for transmission of the reference signal. A radio access network device may configure a quantity P of ports of the reference signal. In this specification, angle information and/or delay information may be loaded to each port of the reference signal, that is, each port may be a port obtained through beamforming and/or phase rotation. For example, the reference signal of each port may be obtained by precoding the reference signal based on an angle vector and/or a delay vector.

In this specification, unless otherwise specified or limited, all ports are ports for sending a downlink reference signal (for example, a CSI-RS). For example, P ports in the following descriptions are P ports for sending the downlink reference signal, and $K_1$ ports refer to $K_1$ ports for sending the downlink reference signal. The reference signal of each port may be transmitted by using one or more frequency domain units. It is assumed that transmission bandwidth of the reference signal of each port is N frequency domain units. The N frequency domain units may be frequency contiguous or non-contiguous frequency domain units.

10. Frequency Domain Unit

The frequency domain unit may also be referred to as a frequency unit, represents a unit of a frequency domain resource, and may represent different frequency domain resource granularities. The frequency domain unit may include, for example, but is not limited to, one or more sub-bands (SBs), one or more resource blocks (RBs), one or more resource block groups (RBGs), one or more precoding resource block groups (PRGs), or the like. In the following embodiments, descriptions related to the frequency domain unit are all described by using the sub-band. It should be understood that the sub-band is only one case of the frequency domain unit, and should not constitute any limitation on this application.

The foregoing briefly describes some concepts used in this application.

A method provided in embodiments of this application may be applied to a long term evolution (LTE) system, a 5th generation (5G) system, a new radio (NR) system, a wireless local area network (WLAN) system, a future evolved system, or a plurality of types of communication convergence systems. The 5G system may be a non-standalone (NSA) 5G system or a standalone (SA) 5G system. For ease of description, in embodiments of this application, an example in which the provided method is applied to the 5G system or the NR system is used to describe the method provided in embodiments of this application. When the method provided in embodiments of this application is applied to another system, it is understood that a network element in embodiments of this application is replaced with a network element that has a same or similar function in a corresponding system.

Network elements in this application include a radio access network device and a terminal device. Uplink and downlink communication can be performed between the radio access network device and the terminal device. For example, refer to FIG. 1. A radio access network device and a plurality of terminal devices constitute a communication system. In the communication system, one or more of a terminal device 1 to a terminal device 6 may send uplink information to the radio access network device. The radio access network device may also send downlink information to one or more of the terminal device 1 to the terminal device 6. In addition, some of the terminal devices (for example, the terminal device 4 to the terminal device 6) may constitute another communication system. In the communication system, sidelink communication may be performed between the terminal devices. For example, the terminal device 5 may send sidelink information to the terminal device 4 and the terminal device 6.

The radio access network device is a network-side entity configured to: send a signal, receive a signal, or send the signal and receive the signal. The radio access network device may be an apparatus deployed in a radio access network (RAN) to provide a wireless communication function for the terminal device, for example, may be a base station. The radio access network device may be a macro base station, a micro base station (also referred to as a small cell), a relay station, an access point (AP), or the like in various forms, or may include control nodes in various forms, for example, a network controller. The control node may be connected to a plurality of base stations, and configure resources for a plurality of terminal devices covered by the plurality of base stations. In systems that use different radio access technologies, names of devices having functions of the base station may vary. For example, the device may be referred to as a base transceiver station (BTS) in a global system for mobile communications (GSM) or code division multiple access (CDMA) network, may be referred to as a base station (NodeB) in wideband code division multiple access (WCDMA), may be referred to as an evolved base station (evolved NodeB, eNB or eNodeB) in the LTE system, or may be referred to as a next generation node base station (gNB) in the NR system. A specific name of the base station is not limited in this application. Alternatively, the radio access network device may be a radio controller in a cloud radio access network (CRAN) scenario, a radio access network device in a future evolved public land mobile network (PLMN), a transmission reception point (TRP), or the like.

The terminal device is configured to provide one or more of a voice service or a data connectivity service for a user. The terminal device is a user-side entity configured to: receive a signal, send a signal, or receive the signal and send the signal. The terminal device may also be referred to as user equipment (UE), a terminal, an access terminal, a subscriber unit, a subscriber station, a mobile station, a remote station, a remote terminal, a mobile terminal, a mobile device, a user terminal, a wireless communication device, a user agent, or a user apparatus. The terminal device may be a mobile station (MS), a subscriber unit, an unmanned aerial vehicle, an internet of things (IoT) device, a station (ST) in a wireless local area network (WLAN), a cellular phone, a smartphone, a cordless phone, a wireless data card, a tablet computer, a session initiation protocol (SIP) phone, a wireless local loop (WLL) station, a personal digital assistant (PDA) device, a laptop computer, a machine type communication (MTC) terminal device, a handheld device having a wireless communication function, a computing device or another processing device connected to a wireless modem, a vehicle-mounted device, or a wearable device (which may also be referred to as a wearable intelligent device). Alternatively, the terminal device may be a terminal device in a next-generation communication system, for example, a terminal device in the future evolved PLMN or a terminal device in the NR system.

Figure 2:
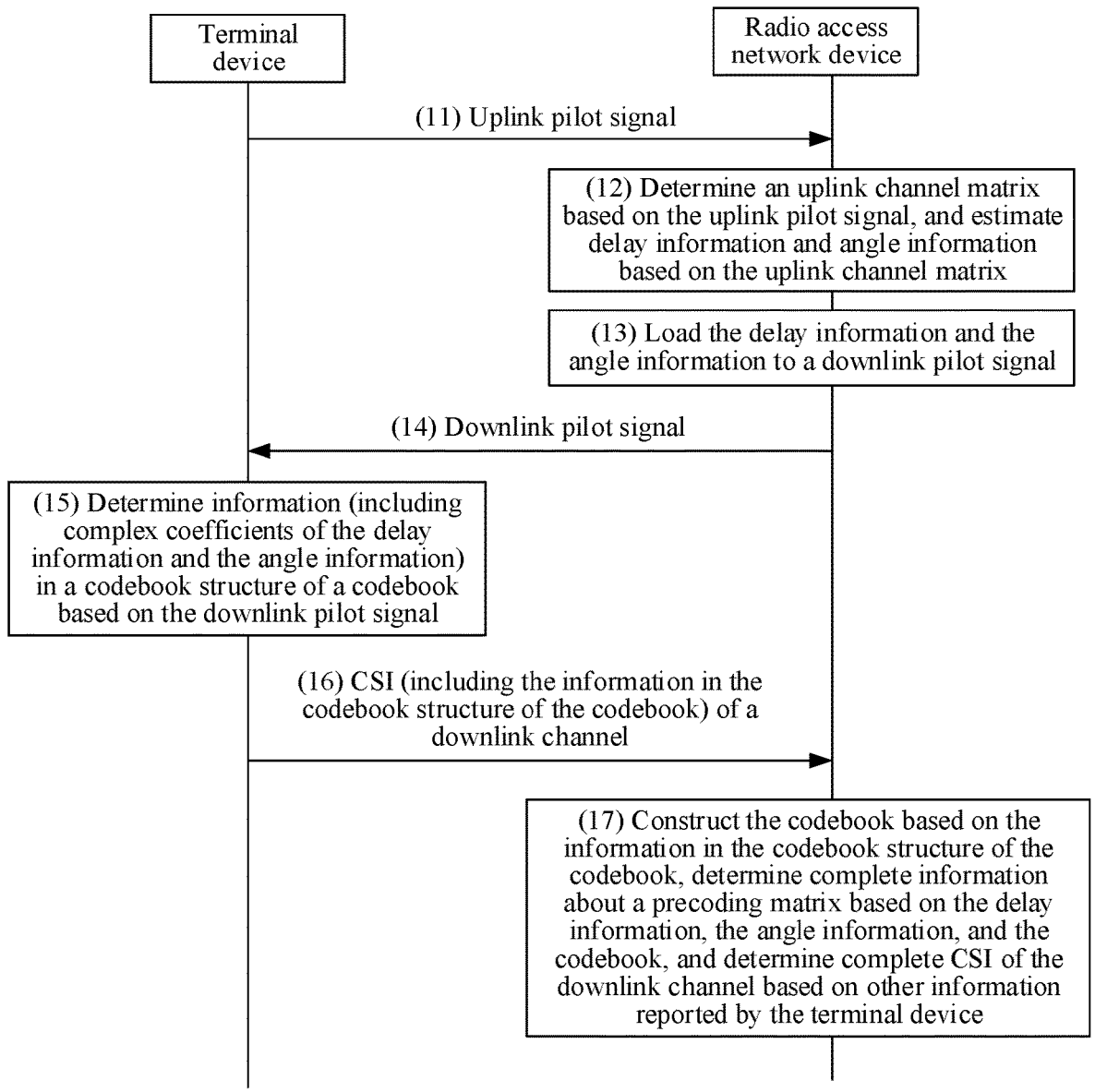
FIG. 2 is a flowchart of obtaining complete CSI of a downlink channel according to an embodiment of this application.

Uplink and downlink channels in an FDD system have partial reciprocity. Information having reciprocity includes delay information and angle information. Therefore, a solution for obtaining downlink CSI may be designed based on the partial reciprocity of FDD. A radio access network device may use the partial reciprocity of FDD to load information with reciprocity obtained from the uplink channel to a reference signal, and send the reference signal to a terminal device. The terminal device needs to feed back only information without reciprocity. The radio access network device determines, by using the information without reciprocity fed back by the terminal device and the information with reciprocity, complete information related to a precoding matrix, and determines complete CSI of the downlink channel. For example, refer to FIG. 2. A process in which the radio access network device obtains the complete CSI of the downlink channel includes the following steps.

(11) The terminal device sends an uplink reference signal to the radio access network device. Correspondingly, the radio access network device receives the uplink reference signal from the terminal device.

(12) The radio access network device determines an uplink channel matrix (namely, uplink CSI) based on the uplink reference signal, and estimates delay information and angle information based on the uplink channel matrix.

(13) The radio access network device loads the delay information and the angle information to a downlink reference signal.

Before step (13), the radio access network device may send configuration information to the terminal device. The configuration information is used to configure a sending periodicity, a time-frequency resource, and the like of the downlink reference signal. In this way, the terminal device receives the downlink reference signal on a corresponding resource.

(14) The radio access network device sends the downlink reference signal to the terminal device. Correspondingly, the terminal device receives the downlink reference signal.

(15) The terminal device determines information in a codebook structure of a codebook based on the downlink reference signal. The information in the codebook structure of the codebook includes complex coefficients (namely, $W_2$ in the following descriptions) of the delay information and angle information.

(16) The terminal device feeds back the CSI of the downlink channel. Correspondingly, the radio access network device receives the CSI of the downlink channel from the terminal device. The CSI of the downlink channel includes the information in the codebook structure of the codebook.

(17) The radio access network device constructs the codebook based on the information in the codebook structure of the codebook, determines complete information about a precoding matrix based on the delay information, the angle information, and the codebook, and determines the complete CSI of the downlink channel based on other information (for example, the foregoing CQI, RI, or LI) reported by the terminal device.

Figure 3:
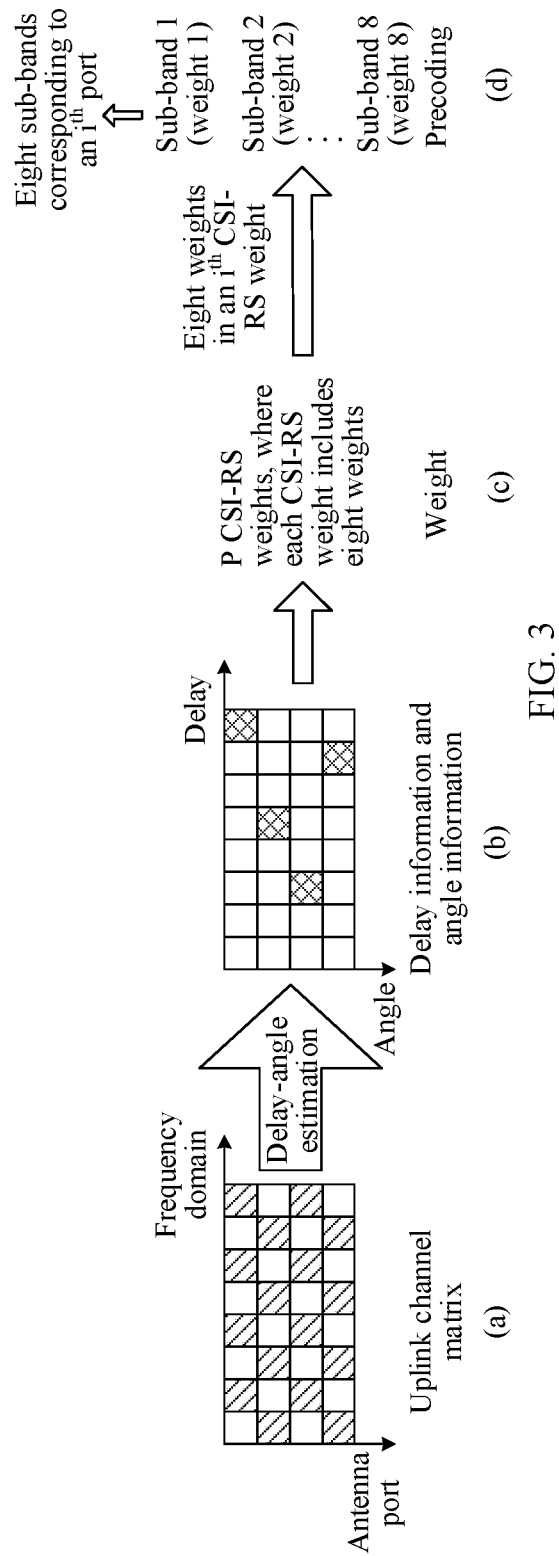
FIG. 3 is a schematic diagram of a process of precoding a CSI-RS on a sub-band according to an embodiment of this application.

Based on examples shown in (a), (b), (c), and (d) in FIG. 3, a specific implementation process of step (12) to step (16) is described below. The implementation process includes the following steps.

Step 1: Refer to (a) in FIG. 3. A dimension of the uplink channel matrix obtained by the radio access network device is rY, where T is a quantity of rows of the uplink channel matrix, and Y is a quantity of columns of the uplink channel matrix. T is a quantity of antenna ports used by the radio access network device to receive the uplink reference signal, and Y is a quantity of subbands that is corresponding to the antenna ports used by the radio access network device to receive the uplink reference signal. One box in the uplink channel matrix shown in (a) in FIG. 3 represents one element, and a value of each element is a complex number. One element represents an amplitude and a phase that are of a channel on one sub-band on one antenna port. In the uplink channel matrix shown in (a) in FIG. 3, an unfilled box represents that energy of a channel corresponding to an element corresponding to the box is weak, and a filled box indicates that energy of a channel corresponding to an element corresponding to the box is strong. The radio access network device performs delay-angle estimation (or performs decomposition on the antenna ports and a frequency domain) on the uplink channel matrix to obtain P angle-delay pairs, where P is a quantity of ports used by the radio access network device to send the downlink reference signal. For example, the downlink reference signal is a CSI-RS. Delay information and angle information that are shown in (b) in FIG. 3 are also a matrix whose dimension is T*Y. One box represents one element in the matrix, and an element corresponding to a filled box in the matrix is corresponding to one angle-delay pair. Refer to (c) in FIG. 3. The radio access network device determines P space-frequency domain vector pairs corresponding to the P angle-delay pairs, and determines P CSI-RS weights based on the P space-frequency domain vector pairs. The P CSI-RS weights are in a one-to-one correspondence with the P ports. It is assumed that each port is corresponding to N sub-bands. Because the CSI-RS on each sub-band needs to be precoded, each CSI-RS weight includes N weights. In other words, for the CSI-RS sent through the P ports, the CSI-RS of each port is corresponding to one group of weights, and the group of weights include a weight corresponding to the CSI-RS of the port on each sub-band. In FIGS. 3, T=4, Y=8, P=4, and N=8 are used as an example for drawing. "*" in this application refers to "multiply". T, Y, P, and N are all integers greater than or equal to 1.

A space-domain frequency domain vector pair corresponding to one angle-delay pair includes a spatial domain vector corresponding to angle information in the angle-delay pair and a frequency domain vector corresponding to delay information in the angle-delay pair. The frequency domain vector and the spatial domain vector may be DFT vectors, or may be other vectors.

Step 2: For an $i^{th}$ port in the P ports, the radio access network device separately precodes the CSI-RS on N sub-bands by using N weights in an $i^{th}$ CSI-RS weight in the P CSI-RS weights, and sends a precoded CSI-RS to the terminal device, where i is an integer greater than 0 and less than or equal to P.

Step 3: The terminal device performs downlink channel measurement based on a received CSI-RS, and determines information about equivalent channels of the P ports. The information about the equivalent channel of the $i^{th}$ port on a sub-band s may be expressed as $H_{eq}^{i,s}$, where s is an integer greater than 0 and less than or equal to N.

Step 4: On the basis of the obtained information about the equivalent channels of the P ports, the terminal device determines the information in the codebook structure based on a related parameter of the codebook structure of the codebook, and sends the information to the radio access network device.

Specifically, a codebook structure of a codebook W may be expressed as:

$$W = W_1 W_2 W_f^H \quad \text{(Formula 1)}$$

$W_1$, $W_2$, and $W_f^H$ are information in the codebook structure.

$W_1$ is a port selection matrix, and a dimension is $P*K_1$, where $K_1$ is a quantity of ports selected by the terminal device from the P ports. The port selection matrix is a matrix including $K_1$ column vectors that correspond to the $K_1$ ports and that are selected by the terminal device from a P*P matrix. Each column vector in the P*P matrix is corresponding to one of the P ports. Each column vector in $W_1$ is corresponding to one of the $K_1$ ports. $W_1$ is used to notify the radio access network device of the ports selected by the terminal device. For example, in each column vector in $W_1$, only one element may be 1, and other elements may be 0. Each row in $W_1$ has at most one non-zero element, and a value of the non-zero element is $1.1 \leq K_1 \leq P$. For example, if P=4, the P*P matrix may be $$\begin{bmatrix} 1 & 0 & 0 & 0 \\ 0 & 1 & 0 & 0 \\ 0 & 0 & 1 & 0 \\ 0 & 0 & 0 & 1 \end{bmatrix},$$

where the $i^{th}$ column vector is corresponding to the $i^{th}$ port, and a value of an $i^{th}$ element in the column vector corresponding to the $i^{th}$ port is 1. If $K_1=2$, and the terminal device selects the $1^{st}$ port and the $3^{rd}$ port, $W_1$ is $$\begin{bmatrix} 1 & 0 \\ 0 & 0 \\ 0 & 1 \\ 0 & 0 \end{bmatrix}.$$

After receiving $W_1$, the radio access network device determines that a value of the $1^{st}$ element in a column vector in $W_1$ is 1, and a value of the $3^{rd}$ element in the other column vector is 1. In this case, it may be determined that the ports selected by the terminal device are the $1^{st}$ port and the $3^{rd}$ port.

$W_2$ is a complex coefficient matrix (which may also be referred to as a coefficient matrix or a combination coefficient matrix), and a dimension is $K_1*M_v$. $W_2$ includes at most $K_o$ non-zero elements, where $1.1 \leq K_0 \leq K_1*M_v$. For example, an element in $W_2$ may be an inner product of an equivalent channel of one of the $K_1$ ports and a frequency domain vector (namely, a column vector) in a frequency domain basis matrix.

$W_f$ is the frequency domain base matrix (which may also be referred to as a frequency domain selection matrix), and a dimension is $N*M_v$. $M_v$ is a quantity of frequency domain vectors (namely, column vectors) included in the frequency domain base matrix. The $M_v$ frequency domain vectors may be frequency domain vectors selected by the terminal device from N' frequency domain vectors configured by the radio access network device for the terminal device, or may be the N' frequency domain vectors configured by the radio access network device for the terminal device (where in this case, the terminal device does not need to perform selection, and $M_v=N'$), where $1 \leq M_v \leq N' \leq N$. The frequency domain vector in $W_f$ may be a DFT vector. The DFT vector includes N elements, the N elements are in a one-to-one correspondence with the N sub-bands, and an $s^{th}$ element in the N elements is $e^{j2\pi n(s-1)/N}$ where n is an index of the DFT vector, and n is an integer greater than or equal to 0 and less than N. $W_f^H$ is a conjugate transpose matrix of $W_f$.

For example, an element in a $j^{th}$ row and a $k^{th}$ column in the complex coefficient matrix may be an inner product of an equivalent channel of a $j^{th}$ port in the $K_1$ ports and a $k^{th}$ frequency domain vector (namely, a $k^{th}$ column vector) in the frequency domain basis matrix, and represents phase information and strength information of an equivalent channel that are found on the $j^{th}$ port within a delay range corresponding to the $k^{th}$ frequency domain vector, where j is an integer greater than 0 and less than or equal to $K_1$, and k is an integer greater than 0 and less than or equal to $M_v$.

It may be learned from the foregoing descriptions of the frequency domain vectors that different frequency domain vectors represent a change rule that is of a channel in frequency domain and that is caused by delays on different transmission paths. Because the radio access network device may obtain delay information of the downlink channel, the radio access network device may determine a delay range of a channel between the radio access network device and the terminal device. The delay range may be indicated by using the N' frequency domain vectors configured by the radio access network device. In this case, $W_2$ indicates phase information and strength information of an equivalent channel that are found by the terminal device within a target delay range on each of the $K_1$ ports. Optionally, the target delay range is a delay range corresponding to the $M_v$ frequency domain vectors in the N' frequency domain vectors, that is, a delay range corresponding to the $M_v$ frequency domain vectors in $W_f$.

Based on the codebook structure shown in Formula 1, the related parameter of the codebook structure includes $K_1$, $\beta$, and $M_v$. $\beta$ is a compression factor, and is used to compress $W_2$ and control feedback overheads of the terminal device. $\beta$ may be, for example, a ratio of non-zero elements in $W_2$. $\beta$ is set to avoid excessive non-zero elements of $W_2$ that increase the feedback overheads of the terminal device. It should be noted that the terminal device needs to report one $W_2$ for each transport layer. An upper limit of quantities of non-zero elements in matrices $W_2$ reported for all transport layers may be $\lfloor \beta * M_v * K_1 \rfloor$. To be specific, a sum of the quantities of non-zero elements in the matrices $W_2$ reported for all the transport layers may be less than or equal to $\lfloor \beta * M_v * K_1 \rfloor$, and cannot be greater than $\lfloor \beta * M_v * K_1 \rfloor$. For example, when the quantity of transport layers is 1 (that is, Rank=1), the upper limit of the quantities of non-zero elements in the matrices $W_2$ reported for all the transport layers may be $\lfloor \beta' * M_v * K_1 \rfloor$. When the quantity of transport layers is greater than 1 (that is, Rank>1), the upper limit of the quantities of non-zero elements in the matrices $W_2$ reported for all the transport layers may be $\lfloor * \beta' * M_v * K_1 \rfloor$. $\beta'$ is $\beta$ when the quantity of transport layers is 1, and $2*\beta'$ is $\beta$ when the quantity of transport layers is greater than 1.

The terminal device may determine $W_1$, $W_2$, and $W_f^H$ based on these parameters and the information about the equivalent channels of the P ports, and send $W_1$, $W_2$, and $W_f^H$ to the radio access network device. It should be noted that, if $M_v=N'$, because the N' frequency domain vectors learned by the terminal device are configured by the radio access network device for the terminal device, the radio access network device knows the information. Therefore, the terminal device does not need to report $W_f^H$ to the radio access network device.

Step 5: The radio access network device constructs the codebook based on the received information in the codebook structure, determines the complete information about the precoding matrix based on the delay information and the angle information, and determines the complete CSI of the downlink channel based on the other information (for example, the foregoing CQI, RI, or LI) reported by the terminal device.

It should be noted that the foregoing method for determining an element in the information in the codebook structure shown in Formula 1 in this application is merely an example, and the element may be determined in another manner during specific implementation. This is not limited in this application.

For the FDD system, the foregoing solution provides the codebook structure, but does not provide a configuration combination of the related parameters of the codebook structure. Currently, a Type II port selection (Port selection) codebook structure in Release 16 (R16 for short) of the existing $3^{rd}$ Generation Partnership Project (3GPP) NR protocol may alternatively be expressed as: $W=W_1 W_2 W_f^H$. $W_1$ is a port selection matrix, and a dimension is $P*2L$. $W_1$ may be expressed as $$\begin{bmatrix} A1 & 0 \\ 0 & A2 \end{bmatrix},$$

where A1 and A2 each are a matrix with P/2 rows and L columns, A1 represents that L ports are selected from P/2 ports in one polarization direction (for example, a horizontal polarization), and A2 represents that L ports are selected from P/2 ports in another polarization direction (for example, a vertical polarization). $W_f$ is a frequency domain basis matrix, includes $M_v$ DFT vectors, and a dimension is $N*M_v$. $W_2$ is a complex coefficient matrix, and a dimension is $2L*M_v$. To limit feedback overheads of information in the codebook structure, triple parameter combinations shown in Table 1 are specified in the existing communication protocol: 3GPP technical specification (TS) 38.214. PV in Table 1 is used to determine a value of My, and the value of $M_v$ may be uniquely determined based on $P_v$. An enhanced Type II codebook in R16 has a similar codebook structure and parameter configuration combinations. Details are not described herein again.

TABLE 1

| Parameter combination | L | $P_V$ (V indicates a quantity of transport layers) | | β |
|---|---|---|---|---|
| | | V ∈ {1, 2} | V ∈ {3, 4} | |
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

For example, when the radio access network device indicates an index 2 in Table 1 for the terminal device, and if the terminal device determines that the quantity of transport layers is 3, the terminal device may determine, based on the index, that the quantity of ports used for port selection in each polarization direction is 2, $P_v$ is ⅛, and β is ½. The terminal device may determine $M_v$ based on $P_v$.

It should be noted that L in Table 1 is the quantity of ports used for port selection in each polarization direction, and $K_1$ in Formula 1 is a quantity of the ports used for port selection in all the polarization directions.

Figure 4A:
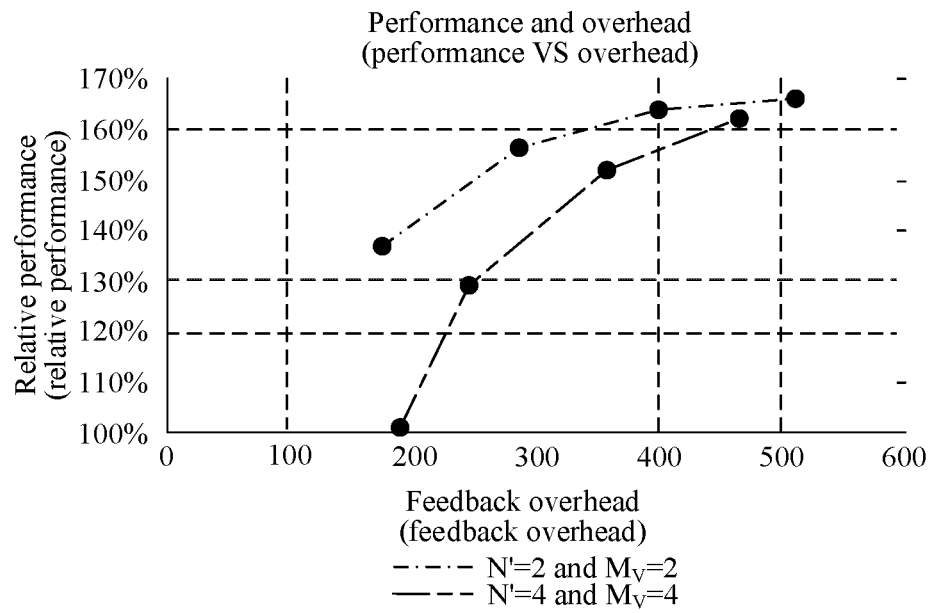
FIG. 4A is a schematic diagram of a simulation result according to an embodiment of this application.

It should be noted that the partial reciprocity of FDD is not considered in the configurations of the related parameters of the codebook structure shown in Table 1. In the FDD system, because the radio access network device may estimate the delay information of the downlink channel based on the uplink channel matrix, the radio access network device may determine the delay range of the channel between the radio access network device and the terminal device. Therefore, the delay range may be indicated by using the N' frequency domain vectors configured by the radio access network device. In this case, the value of $M_v$ may be small, for example, may be 1 or 2. This may also be learned from a simulation diagram shown in FIG. 4A. When $N'=M_v$, a smaller value of $M_v$ has better performance (for example, an average rate of data) when feedback overheads are the same.

It may be learned from Formula 1 that the feedback overheads of the terminal device may be adjusted by adjusting the quantity of non-zero elements in $W_2$. The quantity of non-zero elements in $W_2$ is $\lfloor \beta*M_v*K_1 \rfloor$, where $M_v$ is an integer greater than 0, and $\beta$ is a real number greater than 0 and less than or equal to 1. When the value of $M_v$ is larger, efficiency of adjusting the quantity of non-zero elements in $W_2$ is more affected by $M_v$. Therefore, a quantity of elements in $W_2$ may be preliminarily controlled first by using $M_v$, and the quantity of non-zero elements in $W_2$ may be more accurately controlled by using $\beta$. In an existing technology, a value of $P_v$ is closely related to V (namely, a quantity of transport layers), and $P_v$ is further used to determine $M_v$. Therefore, V is bound to $M_v$, and $M_v$ has a large quantity of values. Therefore, flexibility of adjusting a quantity of non-zero elements in $W_2$ when there are different quantities of transport layers can be well controlled by binding V to $M_v$. However, if the configurations of the related parameters of the codebook structure shown in Table 1 are also used in the FDD system, because $M_v$ has a small quantity of values, the flexibility of adjusting a quantity of non-zero elements in $W_2$ when there are different quantities of transport layers cannot be well controlled by using $M_v$. To resolve this problem, in this application, V is no longer bound to $M_v$, but bound to $\beta$. Because $\beta$ has a large quantity of values, the flexibility of adjusting a quantity of non-zero elements in $W_2$ can be improved. Specifically, this application provides information transmission methods shown in FIG. 4B and FIG. 6.

Figure 4B:
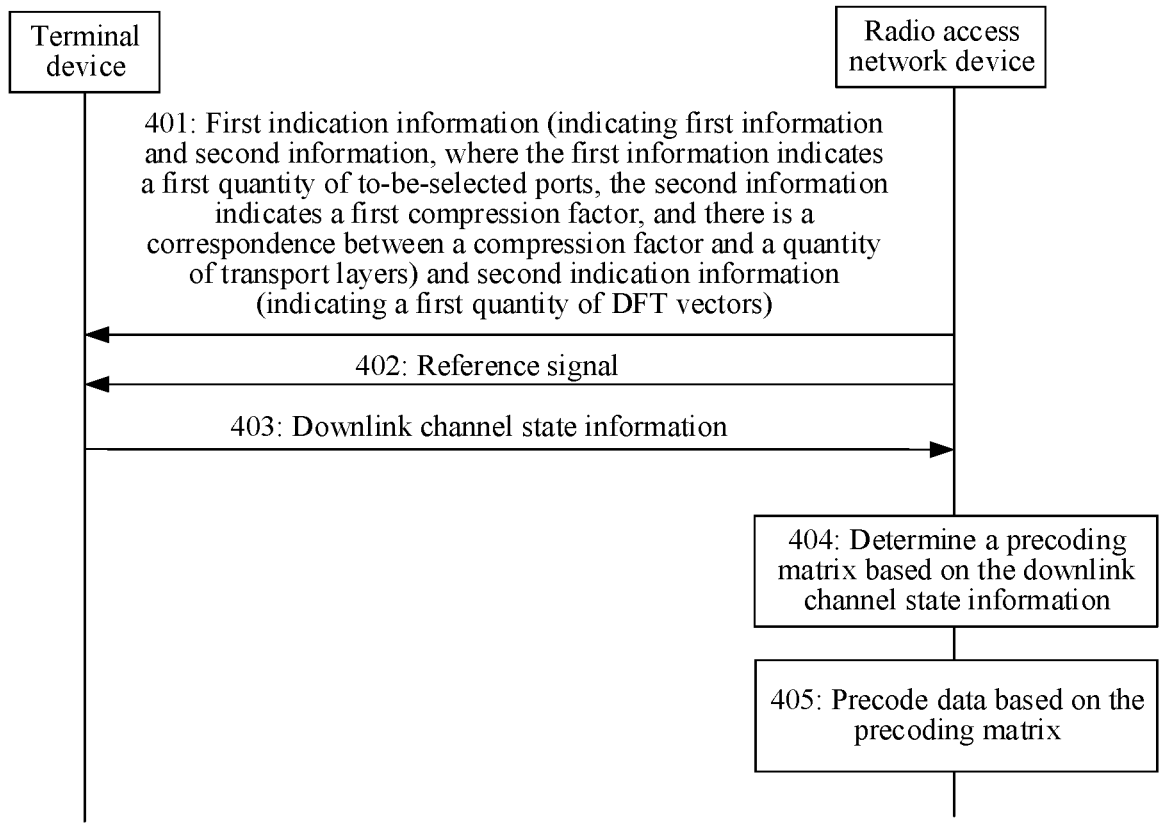
FIG. 4B is a schematic diagram of an information transmission method according to an embodiment of this application.

Refer to FIG. 4B. The information transmission method provided in this application includes the following steps.

401: A radio access network device sends first indication information and second indication information to a terminal device. Correspondingly, the terminal device receives the first indication information and the second indication information from the radio access network device.

The first indication information indicates first information and second information. The first information indicates a first quantity of to-be-selected ports, the first quantity of to-be-selected ports is one of at least one quantity of to-be-selected ports, and the quantity of to-be-selected ports is a possible quantity (namely, $K_1$ or $K_1/2$ in the foregoing descriptions) of ports used by the terminal device to perform port selection. The second information indicates a first compression factor, the first compression factor is one of at least one compression factor, and the compression factor is a possible compression factor (namely, $\beta$ in the foregoing descriptions, where because $\beta$ is related to V in this application, the compression factor in this application is denoted as $\beta_v$) in a complex coefficient matrix (namely, $W_2$ in the foregoing descriptions). There is a correspondence between the compression factor and a quantity of transport layers (namely, a quantity of ranks). The quantity of transport layers is a possible quantity of transport layers that corresponds to downlink channel state information reported by the terminal device to the radio access network device, and may be a quantity of transport layers that corresponds to a codebook. The quantity of transport layers may be determined by the terminal device. For example, the terminal device determines rates corresponding to a plurality of quantities of transport layers, determines a quantity of transport layers with a highest rate as the quantity of transport layers that corresponds to the codebook. After determining the quantity of transport layers that corresponds to the codebook, the terminal device needs to report a complex coefficient matrix for each transport layer. The plurality of quantities of transport layers may be indicated by the radio access network device to the terminal device, or may be determined by the terminal device. This is not limited in this application. Alternatively, the terminal device may determine the quantity of transport layers that corresponds to the codebook by using another method. This is not limited in this application.

The second indication information indicates a first quantity of DFT vectors, the first quantity of DFT vectors is one of at least one quantity of DFT vectors, and the quantity of DFT vectors is a possible quantity (namely, $M_v$ in the foregoing descriptions, where because the quantity of DFT vectors in the foregoing descriptions is related to V, but is irrelevant to V in this application, the quantity is denoted as M in this application) of DFT vectors included in a frequency domain basis matrix (namely, $W_f$ in the foregoing descriptions).

For example, the first information may be the first quantity of to-be-selected ports, or may be a ratio of the first quantity of to-be-selected ports to a first quantity of transmit ports (where the first quantity of transmit ports is a quantity that is indicated by the radio access network device to the terminal device and that is of ports for sending a reference signal). If the first information is the ratio, because the terminal device may learn of a total quantity P of ports, the first quantity of to-be-selected ports may be determined based on the ratio and the total quantity P of ports.

The quantity of to-be-selected ports may be a quantity of ports used by the terminal device for port selection in all polarization directions (where in this case, the first quantity of to-be-selected ports indicates $K_1$), or may be a quantity of ports used by the terminal device for port selection in each polarization direction (where in this case, the first quantity of to-be-selected ports indicates $K_1/2$). The polarization direction is a polarization direction of an antenna of the radio access network device, and includes horizontal polarization and vertical polarization. The radio access network device sends a CSI-RS on a port by using the horizontal polarization or the vertical polarization. For example, if the radio access network device sends the CSI-RS on 32 ports in total, the first information may be a quantity of ports selected by the terminal device from the 32 ports. If the radio access network device sends the CSI-RS on the 32 ports in total, sends the CSI-RS on 16 ports by using a polarization direction 1, and sends the CSI-RS on the other 16 ports by using a polarization direction 2, the first information may be a quantity of ports selected by the terminal device from the 16 ports. It should be noted that quantities of ports selected by the terminal device in different polarization directions may be the same. For example, the terminal device selects the first five ports from the 16 ports corresponding to the polarization direction 1, and also selects the first five ports from the 16 ports corresponding to the polarization direction 2. The quantities of ports selected by the terminal device in different polarization directions may alternatively be different. For example, the terminal device selects the first five ports from the 16 ports corresponding to the polarization direction 1, and selects the last five ports from the 16 ports corresponding to the polarization direction 2. The polarization direction 1 is the horizontal polarization, and the polarization direction 2 is the vertical polarization. Alternatively, the polarization direction 1 is the vertical polarization, and the polarization direction 2 is the horizontal polarization.

For example, the second information may be the compression factor in the complex coefficient matrix. For example, the compression factor may be a ratio of non-zero elements, or may be a quantity of non-zero elements in complex coefficient matrices reported for all transport layers. If the compression factor is the quantity of non-zero elements in the complex coefficient matrices reported for all the transport layers, the terminal device may determine the ratio of non-zero elements in the complex coefficient matrices based on the quantity of non-zero elements in the complex coefficient matrices reported for all the transport layers and a total quantity of elements in a complex coefficient matrix reported for a single transport layer. It should be noted that, when the second information is the quantity of non-zero elements in the complex coefficient matrices reported for all the transport layers, the terminal device may directly determine, based on the second information, the quantity of non-zero elements in the complex coefficient matrices reported for all the transport layers instead of calculating the ratio of non-zero elements in the complex coefficient matrix. For ease of description, this application is described below by using an example in which $\beta_{\nu}'$ is the ratio of non-zero elements.

The complex coefficient matrix indicates phase information and strength information of an equivalent channel that are found by the terminal device within a target delay range on each of the $K_i$ ports selected by the terminal device. The frequency domain basis matrix indicates the target delay range. The target delay range is a delay range corresponding to M frequency domain vectors in the frequency domain basis matrix. The complex coefficient matrix is determined based on the ports selected by the terminal device and the frequency domain basis matrix. Specifically, the complex coefficient matrix is determined based on the frequency domain basis matrix and equivalent channels of the ports selected by the terminal device. For example, an element in a $j^{th}$ row and a $k^{th}$ column in the complex coefficient matrix may be an inner product of an equivalent channel of a $j^{th}$ port in the $K_1$ ports and a $k^{th}$ frequency domain vector (namely, a $k^{th}$ column vector) in the frequency domain basis matrix, where j is an integer greater than 0 and less than or equal to $K_1$, and k is an integer greater than 0 and less than or equal to M. It should be noted that an example is used to describe only a method for determining the element in the complex coefficient matrix. During actual implementation, another method may be used to determine the element in the complex coefficient matrix. This does not affect implementation of the method provided in embodiments of this application.

It should be noted that, when feeding back the complex coefficient matrix, the terminal device feeds back one complex coefficient matrix for each transport layer. In addition to feeding back information in the foregoing codebook structure, the terminal device further feeds back an index of a non-zero element in the complex coefficient matrix corresponding to each transport layer. That is, when compression factors are the same, a larger quantity of transport layers indicates higher feedback overheads of the terminal device. Therefore, to control the overheads of the terminal device, a larger quantity of transport layers indicates a smaller compression factor. For example, when the quantity of transport layers is 1, the compression factor is 0.75; and when the quantity of transport layers is 4, the compression factor is 0.25.

Based on M and $\beta_{\nu}$ defined in this application, $M_{\nu}$ in Formula 1 may be replaced with M, and $\beta$ may be replaced with $\beta_{\nu}$ for understanding.

402: The radio access network device sends a reference signal to the terminal device. Correspondingly, the terminal device receives the reference signal from the radio access network device. The reference signal is a downlink reference signal.

For example, the reference signal may be a CSI-RS or another reference signal that may be used to implement the solutions of this application.

Before step 402, the radio access network device may load, to the downlink reference signal, delay information and angle information that are obtained by estimating an uplink channel matrix.

403: The terminal device sends the downlink channel state information to the radio access network device based on the first indication information, the second indication information, and the reference signal. Correspondingly, the radio access network device receives the downlink channel state information from the terminal device.

The downlink channel state information may include $W_1$, $W_2$, and $W_f^H$, and may further include information such as a CQI, an RI, and an LI. Specifically, the terminal device may determine $W_1$, $W_2$, and $W_f^H$ based on $K_1$ (or $K_1/2$), $P_{\nu}$, and M that are indicated by the first indication information and second indication information. It should be noted that, if M=N', because N' frequency domain vectors learned by the terminal device are configured by the radio access network device for the terminal device, the radio access network device knows the information. Therefore, the terminal device does not report $W_f^H$ to the radio access network device.

It should be noted that $W_1$, $W_2$, and $W_f^H$ in this application have the same meanings as those of existing $W_1$, $W_2$, and $W_f^H$, and only used $M_{\nu}$ needs to be replaced with M, and used $\beta$ needs to be replaced with $\beta_{\nu}$ for understanding.

404: The radio access network device determines a precoding matrix based on the downlink channel state information.

During specific implementation of step 404, the radio access network device may determine, based on received $W_1$, $W_2$, and $W_f^H$ and the delay information and angle information that are obtained through estimation, complete information about the precoding matrix to determine the precoding matrix.

405: The radio access network device precodes data based on the precoding matrix.

In the method provided in this embodiment of this application, the quantity of transport layers is no longer bound to the quantity of DFT vectors, but is bound to the compression factor. Because the compression factor has a large quantity of values, a problem that a quantity of non-zero elements in the complex coefficient matrix cannot be flexibly adjusted based on configuration of a related parameter of an existing codebook structure when the quantity of DFT vectors has a small quantity of values can be resolved.

Optionally, the first indication information and the second indication information may be implemented in Manner 1 or Manner 2.

Manner 1: The first indication information and the second indication information are implemented separately.

In Manner 1, the first indication information is implemented by using a first index in a first table (that is, the first indication information is the first index), the first table includes a correspondence between the at least one quantity of to-be-selected ports and the at least one compression factor, and the first index indicates the first quantity of to-be-selected ports and the first compression factor. Different quantities of transport layers correspond to a same compression factor, or at least two of the different quantities of transport layers correspond to different compression factors.

It should be noted that, if the different quantities of transport layers correspond to the same compression factor, the first table may not present information about the quantity of transport layers, for example, Table 2. Certainly, the information about the quantity of transport layers may alternatively be presented. This is not limited in this application. If the at least two of the different quantities of transport layers correspond to the different compression factors, only some of the quantities of transport layers may be corresponding to different compression factors, for example, Table 3, or all quantities of transport layers may be corresponding to different compression factors, for example, Table 4.

TABLE 2

| Index (index) | $K_1$ (or $K_1/2$) | $\beta_V$ |
|---|---|---|
| 0 | 12 | 0.5 |
| 1 | 8 | 0.75 |
| 2 | 4 | 0.75 |
| ... | ... | ... |

TABLE 3

| | | $\beta_V$ | |
|---|---|---|---|
| Index | $K_1$ (or $K_1/2$) | $V \in \{1, 2\}$ | $V \in \{3, 4\}$ |
| 0 | 12 | 0.5 | 0.25 |
| 1 | 8 | 0.75 | 0.5 |
| 2 | 4 | 0.75 | 0.5 |
| ... | ... | ... | ... |

TABLE 4

| | | $\beta_V$ | | | |
|---|---|---|---|---|---|
| Index | $K_1$ (or $K_1/2$) | V = 1 | V = 2 | V = 3 | V = 4 |
| 0 | 12 | 0.5 | 0.4 | 0.2 | 0.2 |
| 1 | 8 | 0.75 | 0.6 | 0.5 | 0.35 |
| 2 | 4 | 0.75 | 0.6 | 0.45 | 0.3 |
| ... | ... | ... | ... | ... | ... |

Based on an example shown in Table 3, if the first indication information is an index 1, the quantity of transport layers is 2, and the $2^{nd}$ column in Table 3 is $K_1$, the first indication information indicates that the first quantity of to-be-selected ports is 8, and the first compression factor is 0.75.

In Manner 1, the second indication information further indicates the first quantity of transmit ports, the first quantity of transmit ports is one of at least one quantity of transmit ports, and the quantity (namely, P in the foregoing descriptions) of transmit ports is a possible quantity of ports used by the radio access network device to send the reference signal.

Optionally, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors. For a possible second table, refer to Table 5.

TABLE 5

| Index | P | M |
|---|---|---|
| 0 | 32 | 1 |
| 1 | 24 | 1 |
| 2 | 16 | 1 |
| 3 | 16 | 2 |
| 4 | 12 | 1 |
| 5 | 12 | 2 |
| ... | ... | ... |

Based on an example shown in Table 5, if the second indication information is an index 1, the first quantity of transmit ports is 24, and the first quantity of DFT vectors is 1.

It should be noted that a larger value of M indicates smaller pilot overheads of the radio access network device. For example, if M=2, the terminal device may feed back 32 coefficients (that is, the complex coefficient matrix includes 32 elements) on 16 ports; and if M=1, the terminal device may feed back the 32 coefficients on only 32 ports. It may be learned that, for $K_1$, feedback overheads of the terminal device when M≥2 are far higher than feedback overheads of the terminal device when M=1. Therefore, in consideration of the feedback overheads of the terminal device, M≥2 does not need to be applied to a case in which there is a large quantity of ports. For example, M≥2 may be applied only to a case in which the quantity P of ports is less than or equal to $P_1(M)$, where $P_1(M)$ represents an integer associated with M, for example, $P_1(2)=16$. Based on this, the radio access network device may limit a combination of M and P, and limit usage of M≥2 in only a case in which there is a small quantity of ports, to control the feedback overheads of the terminal device. For example, for a combination of M and P, refer to Table 5. It should be noted that although a value of $K_1$ actually affects the feedback overheads of the terminal device, the value of $K_1$ in the first table may be limited by limiting the combination of M and P, to indirectly control the feedback overheads of the terminal device. For example, if M=2 and P=8, the first information cannot indicate a value greater than 8 to the terminal device, to indirectly control the feedback overheads of the terminal device.

It should be noted that the first quantity of transmit ports and the first quantity of DFT vectors may alternatively be separately indicated. This is not limited in this application.

In Manner 1, if the second indication information further indicates the first quantity of transmit ports, optionally, the method further includes: The radio access network device sends second configuration information to the terminal device, where the second configuration information is used to configure the second table. Correspondingly, the terminal device receives the second configuration information from the radio access network device, and determines the second table based on the second configuration information.

Manner 2: The first indication information and the second indication information are implemented together.

In Manner 2, the first indication information and the second indication information are implemented by using a first index in a first table, the first table includes a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor. Different quantities of transport layers correspond to a same compression factor, or at least two of the different quantities of transport layers correspond to different compression factors.

In Manner 2, the radio access network device sends the first index to the terminal device. The first index indicates both information indicated by the first indication information and information indicated by the second indication information.

It should be noted that, if the different quantities of transport layers correspond to the same compression factor, the first table may not present information about the quantity of transport layers, for example, Table 6. Certainly, the information about the quantity of transport layers may alternatively be presented. This is not limited in this application. If the at least two of the different quantities of transport layers correspond to the different compression factors, only some of the quantities of transport layers may be corresponding to the different compression factors, for example, Table 7, or all quantities of transport layers may be corresponding to the different compression factors, for example, Table 8.

TABLE 6

| Index | M | $K_1$ or $K_1/2$ | $\beta_V$ |
|---|---|---|---|
| 0 | 1 | 12 | 0.5 |
| 1 | 1 | 8 | 0.75 |
| 2 | 1 | 4 | 0.75 |
| 3 | 2 | 10 | 0.4 |
| 4 | 2 | 6 | 0.6 |
| 5 | 2 | 4 | 0.6 |
| ... | ... | ... | ... |

TABLE 7

| | | | $\beta_V$ | |
|---|---|---|---|---|
| Index | M | $K_1$ or $K_1/2$ | $V \in \{1, 2\}$ | $V \in \{3, 4\}$ |
| 0 | 1 | 12 | 0.5 | 0.25 |
| 1 | 1 | 8 | 0.75 | 0.5 |
| 2 | 1 | 4 | 0.75 | 0.5 |
| 3 | 2 | 10 | 0.4 | 0.2 |
| 4 | 2 | 6 | 0.6 | 0.4 |
| 5 | 2 | 4 | 0.6 | 0.4 |
| ... | ... | ... | ... | ... |

TABLE 8

| | | | $\beta_V$ | | | |
|---|---|---|---|---|---|---|
| Index | M | $K_1$ or $K_1/2$ | $V = 1$ | $V = 2$ | $V = 3$ | $V = 4$ |
| 0 | 1 | 12 | 0.5 | 0.4 | 0.2 | 0.2 |
| 1 | 1 | 8 | 0.75 | 0.6 | 0.5 | 0.35 |
| 2 | 1 | 4 | 0.75 | 0.6 | 0.45 | 0.3 |
| 3 | 2 | 10 | 0.4 | 0.3 | 0.25 | 0.2 |
| 4 | 2 | 6 | 0.6 | 0.5 | 0.4 | 0.35 |
| 5 | 2 | 4 | 0.6 | 0.5 | 0.45 | 0.3 |
| ... | ... | ... | ... | ... | ... | ... |

In Manner 2, the radio access network device may independently indicate P to the terminal device.

Based on Manner 1 and Manner 2, the first table may be directly configured in the terminal device, or may be configured by the radio access network device for the terminal device. If the first table is configured by the radio access network device for the terminal device, the method further includes: The radio access network device sends first configuration information to the terminal device, where the first configuration information is used to configure the first table. Correspondingly, the terminal device receives the first configuration information from the radio access network device, and determines the first table based on the first configuration information. The first table in this application may also be referred to as a codebook structure parameter configuration combination table.

The first configuration information and/or the second configuration information may be carried in an RRC message.

In the foregoing embodiment, if the first table does not include information about M, when the first table is directly configured in the terminal device, compared with Table 1, the first table includes less information. Therefore, less storage resources are occupied, and storage resources of the terminal device are saved. When the first table is configured by the radio access network device for the terminal device, compared with Table 1, the first table includes less information. Therefore, transmission resources are saved.

It may be understood that because the value of M is independently indicated in the first table in Manner 1, configuration of a related parameter of the codebook structure is more flexible than that in Manner 2.

Optionally, the quantity (namely, M) of DFT vectors is 1 or 2. Optionally, N'=M.

In an FDD system, the value of M has the following two cases:

Case 1: N'=M. In this case, the radio access network device directly configures $W_f$, and the terminal device neither constructs $W_f$ nor reports $W_f$.

Case 2: N'>M. In this case, the terminal device selects M frequency domain vectors from the configured N' frequency domain vectors to form $W_f$, and the terminal device may report $W_f$ or may not report $W_f$ (for example, when N'=2 and M=1).

Figure 5:
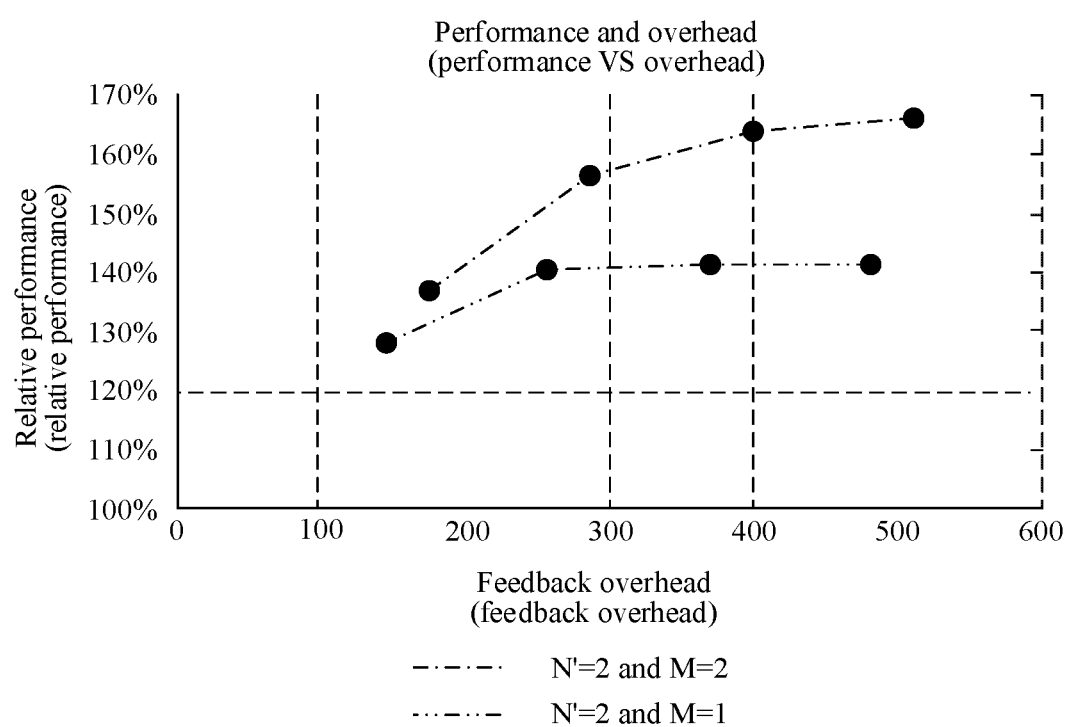
FIG. 5 is a schematic diagram of a simulation result according to an embodiment of this application.

FIG. 5 shows performance simulation results of the terminal device in the two cases. It may be learned from the simulation results in FIG. 5 that, compared with Case 2, Case 1 can provide better performance under same feedback overheads. That is, the direct configuration of $W_f$ by the radio access network device may provide the better performance. Therefore, in this application, N' may be enabled to be equal to M, to improve the performance of the terminal device.

Figure 6:
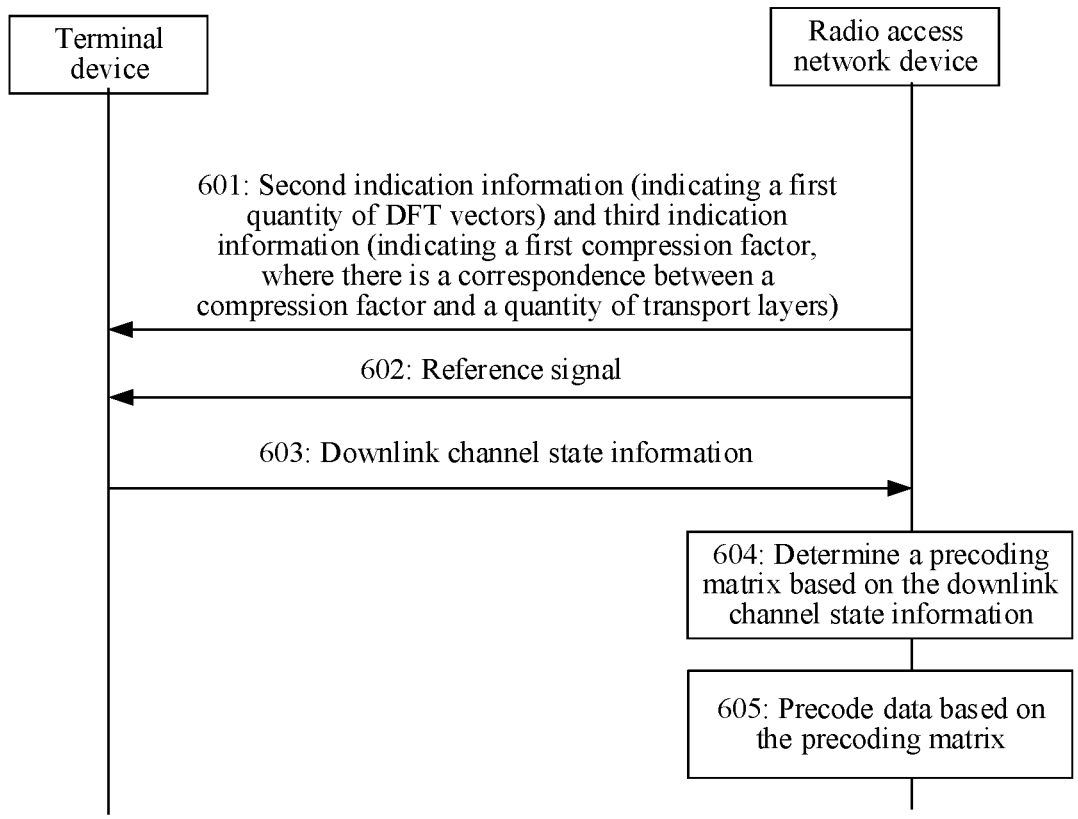
FIG. 6 is a schematic diagram of another information transmission method according to an embodiment of this application.

Refer to FIG. 6. Another information transmission method provided in this application includes the following steps.

601: A radio access network device sends second indication information and third indication information to a terminal device. Correspondingly, the terminal device receives the second indication information and the third indication information from the radio access network device.

The second indication information indicates a first quantity of DFT vectors, the first quantity of DFT vectors is one of at least one quantity of DFT vectors, and the quantity of DFT vectors is a possible quantity of DFT vectors included in a frequency domain basis matrix. The third indication information indicates a first compression factor, the first compression factor is one of at least one compression factor, the compression factor is a possible compression factor of a complex coefficient matrix, and the complex coefficient matrix is determined based on a port selected by the terminal device and the frequency domain basis matrix. There is a correspondence between the compression factor and a quantity of transport layers. The quantity of transport layers is a possible quantity of transport layers that corresponds to downlink channel state information reported by the terminal device to the radio access network device.

For explanations of related nouns in the embodiment shown in FIG. 6, refer to the embodiment shown in FIG. 4B. Details are not described again.

Optionally, a quantity of to-be-selected ports is a preset value, and the quantity of to-be-selected ports is a quantity of ports used for port selection when the terminal device sends the downlink channel state information to the radio access network device (which may be a quantity of ports used by the terminal device to perform port selection in all polarization directions, or may be a quantity of ports used by the terminal device to perform port selection in a single polarization direction). For example, the preset value may be P (where in this case, the quantity of ports used by the terminal device to perform port selection is the quantity of ports used by the terminal device to perform port selection in all the polarization directions), P/2, P/4, P/8, or another value. This is not limited in this application.

Optionally, the quantity (namely, M) of DFT vectors is 1.

It may be learned from Formula 1 that feedback overheads of the terminal device may be adjusted by adjusting a quantity of non-zero elements in $W_2$. The quantity of non-zero elements in $W_2$ is $\lfloor \beta_v * M_v * K_1 \rfloor$. When M=2, a quantity of elements in $W_2$ may be preliminarily controlled by using $K_1$, and the quantity of non-zero elements in $W_2$ may be more accurately controlled by using $\beta_v$. Specifically, when M=2, if $K_1$ is changed (increased or decreased) by X, the quantity of elements in $W_2$ is changed (increased or decreased) by 2×. In this case, the quantity of non-zero elements in $W_2$ may be greatly changed by changing a value of $K_1$. After the quantity of non-zero elements in $W_2$ is changed by changing the value of $K_1$, the quantity of non-zero elements in $W_2$ is more accurately controlled by using $\beta_v$, so that configuration flexibility and overheads can be well balanced. When M=1, the overheads and the flexibility are the same when the quantity of elements in $W_2$ is controlled by using $K_1$ or $\beta_v$. Specifically, when M=1, if $K_1$ is changed (increased or decreased) by X, the quantity of elements in $W_2$ is changed (increased or decreased) by X. When the quantity of elements in $W_2$ is adjusted based on $\beta_v$, an odd quantity of elements may further be reduced or increased. Therefore, when M=1, the feedback overheads of the terminal device may be controlled by adjusting only $\beta_v$.

Therefore, in the embodiment shown in FIG. 6, $K_1$ may be enabled to be a preset value, and the feedback overheads of the terminal device are controlled by adjusting the compression factor. In this case, a first table may not include information about $K_1$. When the first table is directly configured in the terminal device, the first table includes less information. Therefore, less storage resources are occupied, and storage resources of the terminal device are saved. When the first table is configured by the radio access network device for the terminal device, the first table includes less information. Therefore, transmission resources are saved.

The third indication information and the second indication information may be separately implemented. In this case, the third indication information may be an index in the first table. A difference from the embodiment shown in FIG. 4B lies in that the first table (for example, Table 2, Table 3, or Table 4) does not include information about the quantity of to-be-selected ports (that is, does not include information about $K_1$ or $K_1/2$). The third indication information and the second indication information may alternatively be implemented together. In this case, the third indication information and the second indication information may be an index in the first table. A difference from the embodiment shown in FIG. 4B lies in that the first table (for example, Table 6, Table 7, or Table 8) does not include information about the quantity of to-be-selected ports (that is, does not include information about $K_1$ or $K_1/2$). This may be understood based on Manner 1 and Manner 2 in the embodiment shown in FIG. 4B. Details are not described again.

602: The radio access network device sends a reference signal to the terminal device. Correspondingly, the terminal device receives the reference signal from the radio access network device. For related descriptions of step 602, refer to step 402. Details are not described again.

603: The terminal device sends the downlink channel state information to the radio access network device based on the second indication information, the third indication information, and the reference signal. Correspondingly, the radio access network device receives the downlink channel state information from the terminal device.

The downlink channel state information may include $W_1$, $W_2$, and $W_f^H$, and may further include information such as a CQI, an RI, and an LI. Specifically, the terminal device may determine $W_1$, $W_2$, and $W_f^H$ based on a preset quantity of to-be-selected ports and $\beta_v$ and M that are indicated by the second indication information and the third indication information. It should be noted that, if M=N', because N' frequency domain vectors learned by the terminal device are configured by the radio access network device for the terminal device, the radio access network device knows the information. Therefore, the terminal device does not report $W_f^H$ to the radio access network device.

It should be noted that $W_1$, $W_2$, and $W_f^H$ in this application have the same meanings as those of existing $W_1$, $W_2$, and $W_f^H$, and only used M, needs to be replaced with M, and used $\beta$ needs to be replaced with $\beta_v$ for understanding.

604: The radio access network device determines a precoding matrix based on the downlink channel state information. For related descriptions of step 604, refer to step 404. Details are not described again.

605: The radio access network device precodes data based on the precoding matrix.

Optionally, the second indication information further indicates a first quantity of transmit ports, the first quantity of transmit ports is one of at least one quantity of transmit ports, and the quantity of transmit ports is a possible quantity of ports used by the radio access network device to send the reference signal. For specific implementation of the optional method, refer to the related descriptions in the embodiment shown in FIG. 4B. Details are not described again.

Optionally, the second indication information is implemented by using a second index in a second table, the second table includes a correspondence between the at least one quantity of transmit ports and the at least one quantity of DFT vectors, and the second index indicates the first quantity of transmit ports and the first quantity of DFT vectors. For specific implementation of the optional method, refer to the related descriptions in the embodiment shown in FIG. 4B. Details are not described again.

Optionally, the method further includes: The radio access network device sends second configuration information to the terminal device. The second configuration information is used to configure the second table. Correspondingly, the terminal device receives the second configuration information from the radio access network device. For specific implementation of the optional method, refer to the related descriptions in the embodiment shown in FIG. 4B. Details are not described again.

In another implementation of the technical solution shown in FIG. 6, the third indication information may further indicate a first quantity of to-be-selected ports. In this case, the quantity (namely, M) of DFT vectors is 1. It may be learned from the foregoing descriptions that when M=1, in addition to controlling the feedback overheads of the terminal device by adjusting the compression factor, the feedback overheads of the terminal device may alternatively be controlled by adjusting only the quantity of to-be-selected ports. In this case, the compression factor may be determined as a preset value. In this case, the first table may not include information about $\beta_v$. When the first table is directly configured in the terminal device, the first table includes less information. Therefore, less storage resources are occupied, and storage resources of the terminal device are saved. When the first table is configured by the radio access network device for the terminal device, the first table includes less information. Therefore, transmission resources are saved.

In the method provided in this embodiment of this application, the quantity of transport layers is no longer bound to the quantity of DFT vectors, but is bound to the compression factor. Because the compression factor has a large quantity of values, a problem that a quantity of non-zero elements in the complex coefficient matrix cannot be flexibly adjusted based on configuration of a related parameter of an existing codebook structure when the quantity of DFT vectors has a small quantity of values can be resolved.

Table 2 to Table 8 are merely examples of the first table and the second table in embodiments of this application. During actual implementation, values in the first table and the second table may be other values. Specific values may be specified in a protocol, preconfigured, configured by the radio access network device, or determined by the radio access network device and the terminal device through negotiation. This is not limited in this application. Examples are shown by using examples in which $\beta_v$ in each of Table 2 to Table 4 and Table 6 to Table 8 is a ratio of non-zero elements.

In descriptions of this application, unless otherwise specified, "/" means "or". For example, A/B may indicate A or B. A term "and/or" in this specification describes only an association relationship between associated objects and indicates that there may be three relationships. For example, A and/or B may indicate the following three cases: Only A exists, both A and B exist, and only B exists. In addition, "at least one" means one or more, and "a plurality of" means two or more. Words such as "first" and "second" do not limit a quantity and an execution sequence, and the words such as "first" and "second" do not indicate a definite difference.

It should be noted that a term such as "example" or "for example" in this application is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a related concept in a specific manner.

The foregoing mainly describes the solutions of embodiments of this application from a perspective of a method. It may be understood that, to implement the foregoing functions, network elements, for example, a radio access network device and a terminal device, each include at least one of a corresponding hardware structure or software module for performing each function. A person skilled in the art should be easily aware that the units and algorithm steps in the examples described with reference to embodiments disclosed in this specification can be implemented in a form of hardware or a combination of the hardware and computer software in this application. Whether a function is performed by hardware or hardware driven by computer software depends on particular applications and design constraints of the technical solutions. A person skilled in the art may use different methods to implement the described functions of each particular application, but it should not be considered that the implementation goes beyond the scope of this application.

In embodiments of this application, the radio access network device and the terminal device may be divided into functional units based on the foregoing method examples. For example, the functional units may be obtained through division based on corresponding functions, or two or more functions may be integrated into one processing unit. The integrated unit may be implemented in a form of hardware, or may be implemented in a form of a software functional unit. It should be noted that, in embodiments of this application, unit division is an example, and is merely logical function division. During actual implementation, another division manner may be used.

Figure 7:
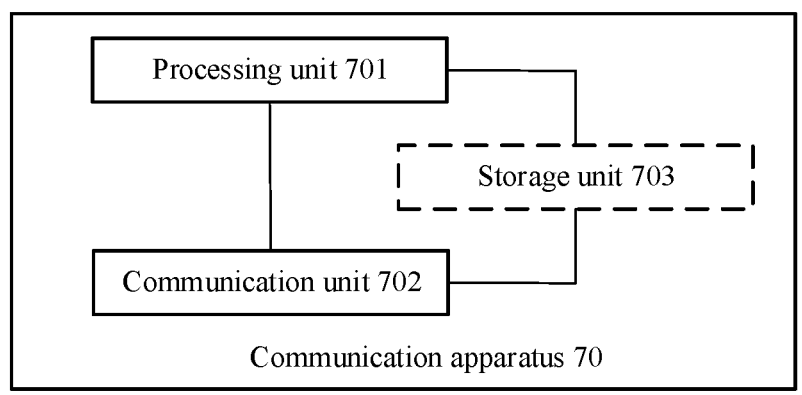
FIG. 7 is a schematic diagram of composition of a communication apparatus according to an embodiment of this application.

For example, FIG. 7 is a schematic diagram of a possible structure of the communication apparatus (denoted as a communication apparatus 70) in the foregoing embodiment. The communication apparatus 70 includes a processing unit 701 and a communication unit 702. Optionally, a storage unit 703 is further included. The communication apparatus 70 may be used to illustrate structures of the terminal device and the radio access network device in the foregoing embodiments.

When the schematic diagram of the structure shown in FIG. 7 is used to show the structure of the terminal device in the foregoing embodiments, the processing unit 701 is configured to control and manage an action of the terminal device. For example, the processing unit 701 is configured to perform 401 to 403 in FIG. 4B, 601 to 603 in FIG. 6, and/or an action performed by the terminal device in another process described in embodiments of this application. The processing unit 701 may communicate with another network entity by using the communication unit 702, for example, communicate with the radio access network device in FIG. 4B. The storage unit 703 is configured to store program code and data of the terminal device.

When the schematic diagram of the structure shown in FIG. 7 is used to show the structure of the radio access network device in the foregoing embodiments, the processing unit 701 is configured to control and manage an action of the radio access network device. For example, the processing unit 701 is configured to perform 401 to 405 in FIG. 4B, 601 to 605 in FIG. 6, and/or an action performed by the radio access network device in another process described in embodiments of this application. The processing unit 701 may communicate with another network entity by using the communication unit 702, for example, communicate with the terminal device in FIG. 4B. The storage unit 703 is configured to store program code and data of the radio access network device.

For example, the communication apparatus 70 may be a device, or may be a chip or a chip system.

When the communication apparatus 70 is a device, the processing unit 701 may be a processor, and the communication unit 702 may be a communication interface, a transceiver, or an input interface and/or an output interface. Optionally, the transceiver may be a transceiver circuit.

Optionally, the input interface may be an input circuit, and the output interface may be an output circuit.

When the communication apparatus 70 is a chip or a chip system, the communication unit 702 may be a communication interface, an input interface and/or an output interface, an interface circuit, an output circuit, an input circuit, a pin, a related circuit, or the like on the chip or the chip system. The processing unit 701 may be a processor, a processing circuit, a logic circuit, or the like.

When the integrated unit in FIG. 7 is implemented in a form of a software functional module and sold or used as an independent product, the integrated unit may be stored in a computer-readable storage medium. Based on such an understanding, the technical solutions of embodiments of this application essentially, or the part contributing to an existing technology, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The storage medium storing the computer software product includes any medium that can store program code, for example, a USB flash drive, a removable hard disk, a read-only memory (ROM), a random access memory (RAM), a magnetic disk, or an optical disc.

Figure 8:
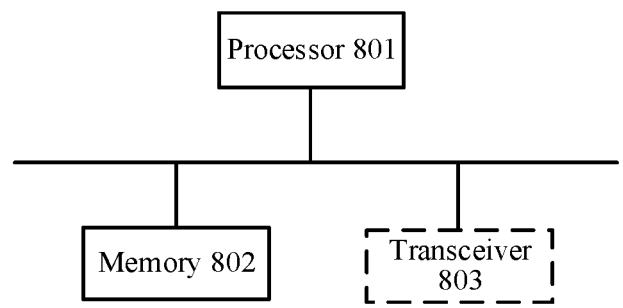
FIG. 8 is a schematic diagram of a hardware structure of a communication apparatus according to an embodiment of this application.
Figure 9:
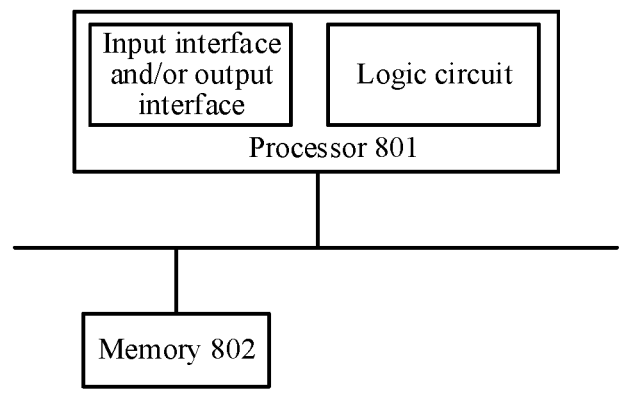
FIG. 9 is a schematic diagram of a hardware structure of another communication apparatus according to an embodiment of this application.

An embodiment of this application further provides a schematic diagram of a hardware structure of a communication apparatus. Refer to FIG. 8 or FIG. 9. The communication apparatus includes a processor 801, and optionally, further includes a memory 802 connected to the processor 801.

The processor 801 may be a general-purpose central processing unit (CPU), a microprocessor, an application-specific integrated circuit (ASIC), or one or more integrated circuits configured to control program execution of the solutions of this application. The processor 801 may alternatively include a plurality of CPUs, and the processor 801 may be a single-core (single-CPU) processor or a multi-core (multi-CPU) processor. The processor herein may refer to one or more devices, circuits, and/or processing cores configured to process data (for example, computer program instructions).

The memory 802 may be a ROM or another type of static storage device that can store static information and instructions, or a RAM or another type of dynamic storage device that can store information and the instructions, or may be an electrically erasable programmable read-only memory (EE-PROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. The memory 802 is not limited in this embodiment of this application. The memory 802 may exist independently (where in this case, the memory 802 may be located outside the communication apparatus, or may be located inside the communication apparatus), or may be integrated with the processor 801. The memory 802 may include computer program code. The processor 801 is configured to execute the computer program code stored in the memory 802, to implement the method provided in embodiments of this application.

In a first possible implementation, referring to FIG. 8, the communication apparatus further includes a transceiver 803. The processor 801, the memory 802, and the transceiver 803 are connected through a bus. The transceiver 803 is configured to communicate with another device or a communication network. Optionally, the transceiver 803 may include a transmitter and a receiver. A component configured to implement a receiving function in the transceiver 803 may be considered as the receiver. The receiver is configured to perform a receiving step in embodiments of this application. A component configured to implement a sending function in the transceiver 803 may be considered as the transmitter. The transmitter is configured to perform a sending step in embodiments of this application.

Based on the first possible implementation, the schematic diagram of the structure shown in FIG. 8 may be used to show structures of the terminal device and the radio access network device in the foregoing embodiments.

When the schematic diagram of the structure shown in FIG. 8 is used to show the structure of the terminal device in the foregoing embodiments, the processor 801 is configured to control and manage an action of the terminal device. For example, the processor 801 is configured to perform 401 to 403 in FIG. 4B, 601 to 603 in FIG. 6, and/or an action performed by the terminal device in another process described in embodiments of this application. The processor 801 may communicate with another network entity by using the transceiver 803, for example, communicate with the radio access network device in FIG. 4B. The memory 802 is configured to store program code and data of the terminal device.

When the schematic diagram of the structure shown in FIG. 8 is used to show the structure of the radio access network device in the foregoing embodiments, the processor 801 is configured to control and manage an action of the radio access network device. For example, the processor 801 is configured to perform 401 to 405 in FIG. 4B, 601 to 605 in FIG. 6, and/or an action performed by the radio access network device in another process described in embodiments of this application. The processor 801 may communicate with another network entity by using the transceiver 803, for example, communicate with the terminal device in FIG. 4B. The memory 802 is configured to store program code and data of the radio access network device.

In a second possible implementation, the processor 801 includes a logic circuit and an input interface and/or an output interface. For example, the output interface is configured to perform a sending action in a corresponding method, and the input interface is configured to perform a receiving action in the corresponding method.

Based on the second possible implementation, the schematic diagram of the structure shown in FIG. 9 may be used to show structures of the terminal device and the radio access network device in the foregoing embodiments.

When the schematic diagram of the structure shown in FIG. 9 is used to show the structure of the terminal device in the foregoing embodiments, the processor 801 is configured to control and manage an action of the terminal device. For example, the processor 801 is configured to perform 401 to 403 in FIG. 4B, 601 to 603 in FIG. 6, and/or an action performed by the terminal device in another process described in embodiments of this application. The processor 801 may communicate with another network entity through the input interface and/or the output interface, for example, communicate with the radio access network device in FIG. 4B. The memory 802 is configured to store program code and data of the terminal device.

When the schematic diagram of the structure shown in FIG. 9 is used to show the structure of the radio access network device in the foregoing embodiments, the processor 801 is configured to control and manage an action of the radio access network device. For example, the processor 801 is configured to perform 401 to 405 in FIG. 4B, 601 to 605 in FIG. 6, and/or an action performed by the radio access network device in another process described in embodiments of this application. The processor 801 may communicate with another network entity through the input interface and/or the output interface, for example, communicate with the terminal device in FIG. 4B. The memory 802 is configured to store program code and data of the radio access network device.

In an implementation process, steps in a method provided in this embodiment may be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module.

An embodiment of this application further provides a computer-readable storage medium, including computer-executable instructions. When the instructions are run on a computer, the computer is enabled to perform any one of the foregoing methods.

An embodiment of this application further provides a computer program product including computer-readable instructions. When the computer-readable instructions are run on a computer, the computer is enabled to perform any one of the foregoing methods.

An embodiment of this application further provides a communication system, including a terminal device and a radio access network device.

An embodiment of this application further provides a chip, including a processor and an interface. The processor is coupled to a memory through the interface. When the processor executes a computer program or computer-executable instructions in the memory, the method provided in any one of the foregoing embodiments is performed.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer-executable instructions. When the computer-executable instructions are loaded and executed on a computer, all or some of the procedures or functions according to embodiments of this application are generated. The computer may be a general-purpose computer, a dedicated computer, a computer network, or another programmable apparatus. The computer-executable instructions may be stored in a computer-readable storage medium or may be transmitted from a computer-readable storage medium to another computer-readable storage medium. For example, the computer-executable instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device integrating one or more usable media, for example, a server or a data center. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another step, and "a" or "one" does not exclude a case of "a plurality of". A single processor or another unit may implement several functions enumerated in the claims. Some measures are recorded in dependent claims that are different from each other, but this does not indicate that these measures cannot be combined to produce a good effect.

Although this application is described with reference to specific features and embodiments thereof, it is clear that various modifications and combinations may be made to them without departing from the protection scope of this application. Correspondingly, this specification and the accompanying drawings are merely example descriptions of this application defined in the appended claims, and are considered to cover any and all modifications, variations, combinations, or equivalents within the scope of this application. It is clear that a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method comprising:
receiving, by a terminal device, first indication information and second indication information from a radio access network device, wherein: the first indication information indicates first information and second information, the second indication information indicates a first quantity of discrete Fourier transform (DFT) vectors, the first quantity of DFT vectors is one quantity of at least one quantity of DFT vectors, each of the at least one quantity of DFT vectors is a possible quantity of DFT vectors comprised in a frequency domain basis matrix, the first information indicates a first quantity of to-be-selected ports, the first quantity of to-be-selected ports is one quantity of at least one quantity of to-be-selected ports, each of the at least one quantity of to-be-selected ports is a possible quantity of ports used by the terminal device to perform port selection, the second information indicates a first compression factor, the first compression factor is one compression factor of at least one compression factor, each of the at least one compression factor is a possible compression factor of a complex coefficient matrix, the complex coefficient matrix is determined based on a port selected by the terminal device and the frequency domain basis matrix, different quantities of transport layers correspond to a same compression factor, the different quantities of transport layers correspond to a same quantity of DFT vectors, and each quantity of transport layers of the different quantities of transport layers is a possible quantity of transport layers that corresponds to downlink channel state information reported by the terminal device to the radio access network device;

receiving, by the terminal device, a reference signal from the radio access network device; and sending, by the terminal device, the downlink channel state information to the radio access network device based on the first indication information, the second indication information, and the reference signal.

2. The method according to claim 1, wherein each of the at least one quantity of to-be-selected ports is a quantity of ports used by the terminal device to perform port selection in each polarization direction.

3. The method according to claim 1, wherein the first indication information and the second indication information are implemented by using a first index in a first table, the first table comprises a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor.

4. The method according to claim 1, wherein each of the at least one quantity of DFT vectors is 1 or 2.

5. A communication apparatus comprising:
at least one processor;
at least one memory configured to store a computer program that, when executed by the at least one processor, causes the communication apparatus to perform at least following operations:
receiving first indication information and second indication information from a radio access network device, wherein the first indication information indicates first information and second information, the second indication information indicates a first quantity of discrete Fourier transform (DFT) vectors, the first quantity of DFT vectors is one quantity of at least one quantity of DFT vectors, each of the at least one quantity of DFT vectors is a possible quantity of DFT vectors comprised in a frequency domain basis matrix, the first information indicates a first quantity of to-be-selected ports, the first quantity of to-be-selected ports is one quantity of at least one quantity of to-be-selected ports, each of the at least one quantity of to-be-selected ports is a possible quantity of ports used by the communication apparatus to perform port selection, the second information indicates a first compression factor, the first compression factor is one compression factor of at least one compression factor, each of the at least one compression factor is a possible compression factor of a complex coefficient matrix, the complex coefficient matrix is determined based on a port selected by the communication apparatus and the frequency domain basis matrix, different quantities of transport layers correspond to a same compression factor, the different quantities of transport layers correspond to a same quantity of DFT vectors, and each quantity of transport layers of the different quantities of transport layers is a possible quantity of transport layers that corresponds to downlink channel state information reported by the communication apparatus to the radio access network device;
receiving a reference signal from the radio access network device; and
sending the downlink channel state information to the radio access network device based on the first indication information, the second indication information, and the reference signal.

6. The communication apparatus according to claim 5, wherein each of the at least one quantity of to-be-selected ports is a quantity of ports used by the communication apparatus to perform port selection in each polarization direction.

7. The communication apparatus according to claim 5, wherein the first indication information and the second indication information are implemented by using a first index in a first table, the first table comprises a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor.

8. The communication apparatus according to claim 5, wherein each of the at least one quantity of DFT vectors is 1 or 2.

9. A communication chip comprising at least one processor, wherein the at least one processor is coupled with at least one memory that stores computer instructions, that when executed by the at least one processor, cause the communication chip to perform at least following operations:
receiving first indication information and second indication information from a radio access network device, wherein: the first indication information indicates first information and second information, the second indication information indicates a first quantity of discrete Fourier transform (DFT) vectors, the first quantity of DFT vectors is one quantity of at least one quantity of DFT vectors, the first quantity of DFT vectors is a possible quantity of DFT vectors comprised in a frequency domain basis matrix, the first information indicates a first quantity of to-be-selected ports, the first quantity of to-be-selected ports is one quantity of at least one quantity of to-be-selected ports, each of the at least one quantity of to-be-selected ports is a possible quantity of ports used by the communication chip to perform port selection, the second information indicates a first compression factor, the first compression factor is one compression factor of at least one compression factor, each of the at least one compression factor is a possible compression factor of a complex coefficient matrix, the complex coefficient matrix is determined based on a port selected by the communication chip and the frequency domain basis matrix, different quantities of transport layers correspond to a same compression factor, the different quantities of transport layers correspond to a same quantity of DFT vectors, and each quantity of transport layers of the different quantities of transport layers is a possible quantity of transport layers that corresponds to downlink channel state information reported by the communication chip to the radio access network device;
receiving a reference signal from the radio access network device; and
sending the downlink channel state information to the radio access network device based on the first indication information, the second indication information, and the reference signal.

10. The communication chip according to claim 9, wherein each of the at least one quantity of to-be-selected ports is a quantity of ports used by the communication chip to perform port selection in each polarization direction.

11. The communication chip according to claim 9, wherein the first indication information and the second indication information are implemented by using a first index in a first table, the first table comprises a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor.

12. The communication chip according to claim 9, wherein each of the at least one quantity of DFT vectors is 1 or 2.

13. A non-transitory computer-readable storage medium storing computer instructions, that when executed by at least one processor, cause the at least one processor to perform at least following operations:

receiving first indication information and second indication information from a radio access network device, wherein: the first indication information indicates first information and second information, the second indication information indicates a first quantity of discrete Fourier transform (DFT) vectors, the first quantity of DFT vectors is one quantity of at least one quantity of DFT vectors, each of the at least one quantity of DFT vectors is a possible quantity of DFT vectors comprised in a frequency domain basis matrix, the first information indicates a first quantity of to-be-selected ports, the first quantity of to-be-selected ports is one quantity of at least one quantity of to-be-selected ports, each of the at least one quantity of to-be-selected ports is a possible quantity of ports used by a communication apparatus to perform port selection, the second information indicates a first compression factor, the first compression factor is one compression factor of at least one compression factor, each of the at least one compression factor is a possible compression factor of a complex coefficient matrix, the complex coefficient matrix is determined based on a port selected by the communication apparatus and the frequency domain basis matrix, different quantities of transport layers correspond to a same compression factor, the different quantities of transport layers correspond to a same quantity of DFT vectors, and each quantity of transport layers of the different quantities of transport layers is a possible quantity of transport layers that corresponds to downlink channel state information reported by the communication apparatus to the radio access network device;

receiving a reference signal from the radio access network device; and sending the downlink channel state information to the radio access network device based on the first indication information, the second indication information, and the reference signal.

14. The non-transitory computer-readable storage medium according to claim 13, wherein each of the at least one quantity of to-be-selected ports is a quantity of ports used by the communication apparatus to perform port selection in each polarization direction.

15. The non-transitory computer-readable storage medium according to claim 13, wherein the first indication information and the second indication information are implemented by using a first index in a first table, the first table comprises a correspondence among the at least one quantity of DFT vectors, the at least one quantity of to-be-selected ports, and the at least one compression factor, and the first index indicates the first quantity of DFT vectors, the first quantity of to-be-selected ports, and the first compression factor.

16. The non-transitory computer-readable storage medium according to claim 13, wherein each of the at least one quantity of DFT vectors is 1 or 2.

* * * * *